(12) United States Patent
Rehberg et al.

(10) Patent No.: US 8,112,707 B2
(45) Date of Patent: Feb. 7, 2012

(54) CAPTURING READING STYLES

(75) Inventors: Charles Rehberg, Nashua, NH (US); Krishnamurthy Satyanarayana, Bangalore (IN); Rengarajan Seshadri, Bangalore (IN); Vasudevan Comandur, Bangalore (IN); Abhishek Mehta, Bangalore (IN); Amit Goel, Bangalore (IN)

(73) Assignee: Trigent Software Ltd., Bangalore (IN)

( * ) Notice: Subject to any disclaimer, the term of this patent is extended or adjusted under 35 U.S.C. 154(b) by 1243 days.

(21) Appl. No.: 11/451,198

(22) Filed: Jun. 10, 2006

(65) Prior Publication Data

US 2007/0136273 A1 Jun. 14, 2007

(30) Foreign Application Priority Data

Dec. 13, 2005 (IN) .......................... 1819/CHE/2005

(51) Int. Cl.
*G06F 17/00* (2006.01)
*G06F 17/20* (2006.01)
(52) U.S. Cl. ...................................................... 715/255
(58) Field of Classification Search ................... 715/255
See application file for complete search history.

(56) References Cited

U.S. PATENT DOCUMENTS

| | | | |
|---|---|---|---|
| 5,404,506 A | | 4/1995 | Fujisawa et al. |
| 6,268,851 B1 * | | 7/2001 | Bricklin et al. ................ 715/744 |
| 6,675,159 B1 * | | 1/2004 | Lin et al. ................................ 1/1 |
| 6,999,972 B2 * | | 2/2006 | Lusen et al. .......................... 1/1 |
| 7,110,988 B1 * | | 9/2006 | Allemann et al. ................. 706/7 |
| 7,756,871 B2 * | | 7/2010 | Yacoub et al. ................. 707/736 |
| 2002/0078090 A1 * | | 6/2002 | Hwang et al. ................. 707/513 |
| 2004/0054672 A1 | | 3/2004 | Tsuchitani et al. |
| 2004/0126840 A1 * | | 7/2004 | Cheng et al. ................. 435/69.1 |
| 2005/0091203 A1 | | 4/2005 | Liu et al. |
| 2006/0190804 A1 * | | 8/2006 | Yang ............................. 715/500 |
| 2006/0248045 A1 * | | 11/2006 | Toledano et al. ................. 707/2 |
| 2007/0169021 A1 * | | 7/2007 | Huynh et al. ................. 717/136 |
| 2010/0198827 A1 * | | 8/2010 | Yacoub et al. ................. 707/739 |

OTHER PUBLICATIONS

Siaw et al.,"Sitehelper: A Localized Agent that Helps Incremental Exploration of the World Wide Web", 1998, Computer Networks, pp. 1-9.*
Jamey Graham, "The Reader's Helper: A Personalized Document Reading Environment", ACM, 1999, pp. 481-488.*
Fragoudis et al.,"Retriever: An Agent for Intelligent Information Recovery", 1999, Association for Information System, pp. 422-427.*

* cited by examiner

*Primary Examiner* — Doug Hutton, Jr.
*Assistant Examiner* — James Debrow
(74) *Attorney, Agent, or Firm* — Ash Tankha; Lipton, Weinberger & Husick

(57) ABSTRACT

Disclosed herein is a method of capturing the reading style, reading plan and private ontology of a user, collectively referred to as the worldview. The process of capturing and applying the reading style includes the following activities: determining the reading style of the user, creating a worldview of the user using the reading style, applying the worldview to a document corpus, determining the information of interest, and reporting the desired information to the user in a report format. The worldview of the user is constructed out of the reading style and the reading plan of the user. Optionally, the user can choose to use a predetermined external ontology to create his/her worldview.

26 Claims, 29 Drawing Sheets

807

DEFINE A NEW RELATIONSHIP

TYPE OF THINGS FOR SOURCE OF RELATIONSHIP

TYPE OF THINGS FOR TARGET OF RELATIONSHIP

RELATIONSHIP IDENTIFIER [ 12345678 ]

DESCRIPTIVE NAME

DESCRIPTION

ON SOURCE: ROLE NAME [         ]   MULTIPLICITY [v]

ON TARGET: ROLE NAME [         ]   MULTIPLICITY [v]

EQUIVALENT WORD FOR PHRASE FOR THIS RELATIONSHIP

VALUE CHANGE INDICATORS [v]

[OK]   [CANCEL]

CAPTURING READING PLAN

READING PLAN IDENTIFIER [ 12345678 ]
DESCRIPTIVE NAME [           ]
DESCRIPTION [                 ]
GOAL OF READING PLAN - TYPE OF THING [▼]
GOAL OF READING PLAN - RELATIONSHIP [▼]
TYPE OF READING PLAN [▼]

[OK] [CANCEL]

FIGURE 8H

CAPTURING READING STYLES

BACKGROUND OF THE INVENTION

The worldwide web contains billions of web pages of information. In addition, a large amount of information is also stored on enterprise systems, public and commercial databases, etc. As the information sources increase, identifying or finding the information of interest is becoming increasingly difficult for a user.

There is a market need to find and present the information of interest of a user among the aforementioned sources of information. The information of interest needs to be derived from one or more information sources. Ideally, the user would require the information of interest to be presented at one instance.

A private ontology comprises definitions of concepts in a user's domain of interest and defines the relationship between the concepts. The private ontology is structured specifically to the view of a user. Typically, experts on specific subject domains create ontologies that are domain specific. However, domain specific ontologies may not necessarily represent the true personal view of the user.

In order to display to the user his/her information of interest, culled from a body of source information in an acceptable amount of time, a method and system are needed that creates each user's view of the world and applies this user specific worldview to find and present information of interest to the user.

SUMMARY OF THE INVENTION

A user's reading style is a formal manifestation of his/her worldview. The method disclosed herein provides a method of capturing and applying the reading style of a user for identifying the information of interest of the user in a document corpus. The process of capturing and applying the reading style includes the following activities: capturing and applying the reading style of the user, creating a worldview of the user using the reading style, applying the worldview to a document corpus, determining the information of interest, and displaying the desired information to the user in the form of a report. The worldview of the user is constructed from the reading style, reading plan and private ontology of the user. Optionally, the user can choose to include a predetermined external ontology to create the worldview. The user chooses a predetermined report format or creates a customized report format for display the rendering of the desired information.

The system disclosed herein is hereafter referred to as the reading style (RS) engine. The RS engine comprises a worldview acquirer, rules generator, report template definer, document reader and reporter. The worldview acquirer acquires the reading style, reading plan and private ontology of a user. The rules generator generates rules based on the reading style, reading plan and private ontology plan acquired by the worldview acquirer. The report template definer generates a user customized report template for presentation. The document reader applies the rules generated by the rules generator and harvests the information of interest. The reporter uses the report template defined by the report template definer and uses the output from the document reader to generate reports that are displayed to the user on a report viewer.

BRIEF DESCRIPTION OF THE DRAWINGS

FIG. 8G illustrates the definition of a new relationship.

FIG. 8H, FIG. 8I, FIG. 8J, FIG. 8K and FIG. 8L illustrate the capture of the reading plan.

DETAILED DESCRIPTION

Definitions

Figure 1A:
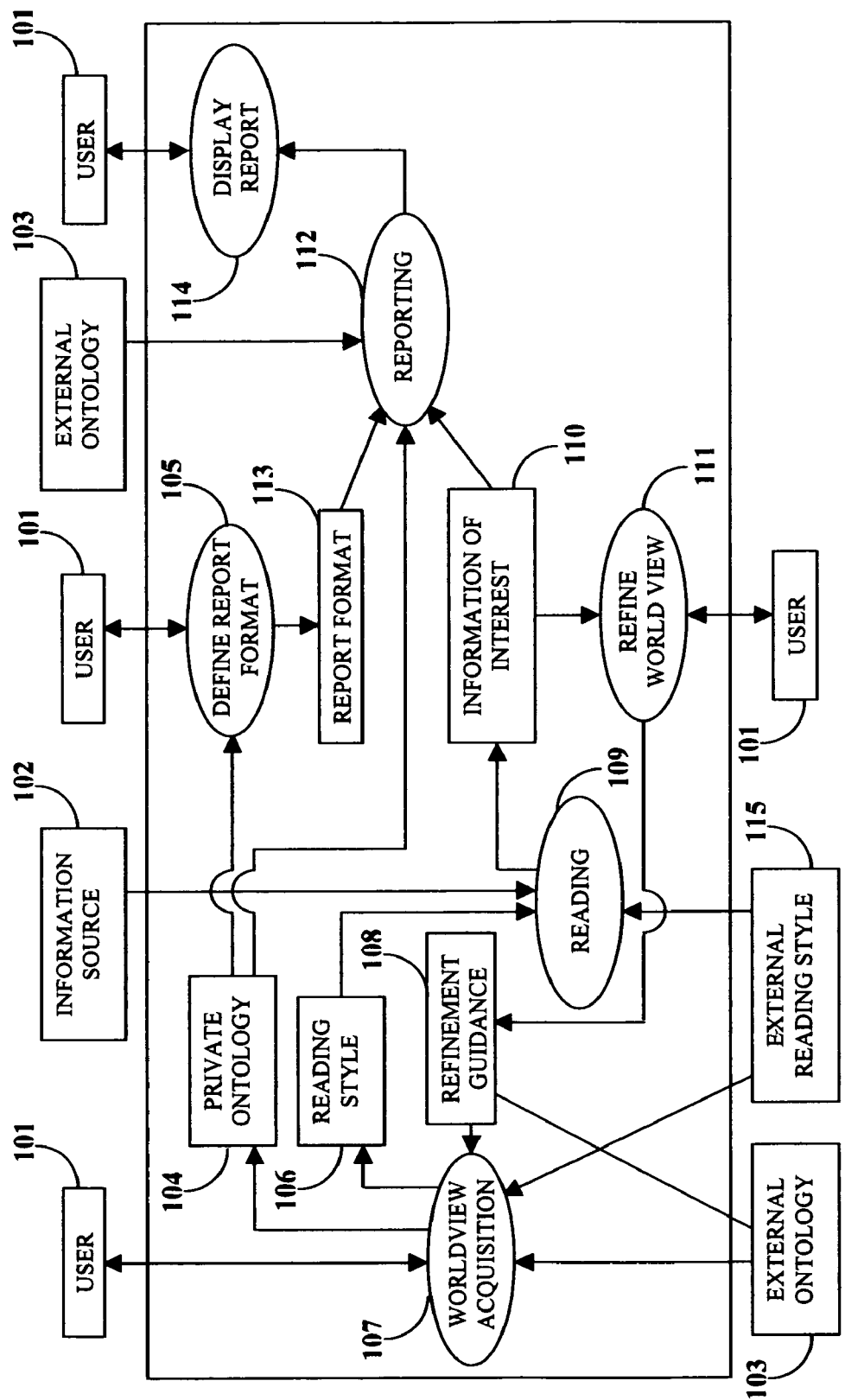
FIG. 1A illustrates the method of creating and applying the reading style of a user to determine the user's worldview and the application of the captured worldview to a document corpus to determine the information of interest of the user.

Atom: The atom is a fundamental unit or a basic building block of a document. For example, a word is an atom in a document containing text.

Characteristic: The "characteristic" is a property of a type of thing.

Concept: A concept is a general idea derived from specific instances. "Types of things" and "concepts" are equivalent terms as used herein.

Conceptionary: A conceptionary is a library that contains information on how words or phrases in one or more given languages are related to concepts. The conceptionary provides the ability to map concepts across languages.

Document: A document is an electronic file, comprising one or more of the following: text, pictures, audio and video.

Fact: A fact is an instance of a concept. For example, "Andre Agassi" is a fact in realm of known "sportsmen".

Information of interest: Information of interest is the information harvested from documents obtained using the worldview.

Pattern: A token recognition pattern is a model to use to interpret tokens from atoms. A concept recognition pattern is a model to use to interpret concepts from tokens.

Private ontology: The private ontology comprises semantic items and their inter-relationships. The private ontology is structured specifically to the view of a user. A private ontology comprises definitions of semantic items in a domain of interest of the user and defines the relationship between the semantic items.

Reading style: The reading style is a set of one or more declared patterns. A declared pattern contains a set of source components. A pattern identifies a specific semantic item. The user declares patterns from source components and thereby captures the reading style. There are different kinds of source components such as atoms, sentences, paragraphs, etc.

Reading plan: The reading plan is a set of steps defined by the user that identifies and controls the evaluation sequence of a source document. The reading plan allows for efficient processing of source documents by reducing the amount of data to be evaluated.

Step: A reading plan step consists of a set of goals that each specifies the selection of the subsequent step to be executed. Every reading plan step has a start point (syntactic unit) and end point (syntactic unit). Using these points a new syntactic unit is extracted from input source.

Goal: A reading plan step goal herein referred to as the "goal" specifies one or more goal elements. Each goal element specifies the number and kind of semantic items that when found during the evaluation of the syntactic unit, satisfies the goal. The first goal satisfied in the sequence of goals, specifies the subsequent step to be executed. It may also specify that evaluation of this document be terminated. If no goal is satisfied, then evaluation of this document is terminated. The defined sequencing of steps in a reading plan represents a directed acyclic graph (DAG).

Semantic item: A semantic item is one of the following: a thing, a type of thing, a characteristic, or a relationship between things and types of things.

Semantic scope: The semantic scope is an identifiable set of semantic items.

Syntactic unit: A syntactic unit is a unit resulting from a structural partitioning of a document. For example, in a text based document, the syntactic unit can be a word, sentence, paragraph, etc.

Thing: Thing is an instance of a concept.

Worldview: The worldview of the user comprises the reading style, reading plan and private ontology of the user. It reflects the logic and structure with which a user comprehends a document.

FIG. 1A illustrates the method of creating and applying the reading style 106 of a user 101 to determine the user's worldview 107 and the application of the captured worldview to an information source 102 or document corpus to determine the information of interest 110 of the user 101. The method of determining the information of interest 110 of a user 101 in a document corpus comprises the following steps: capture the reading style 106 of the user 101, create a worldview 107 of the user using the captured reading style, apply the worldview to a document corpus, determine the information of interest 110, and present the desired information in the form of a report to the user 112, 113. The format of the report 113, 105 is user customizable. The user 101 reads 108 sample documents from an information source 102 and identifies the information of interest 110. The reading style 106 and reading plan of the user is captured in the reading process 109 of the user. The worldview 107 of the user is constructed from the reading style 106, reading plan and private ontology 104 of the user. The worldview is refined 111 by applying user feedback on the initial set of results. Optionally, the user 101 can choose to use a predetermined external ontology 103 and external reading style 115 to supplement their worldview 107. The user 101 then chooses a report format 113 for report display 114.

Figure 1B:
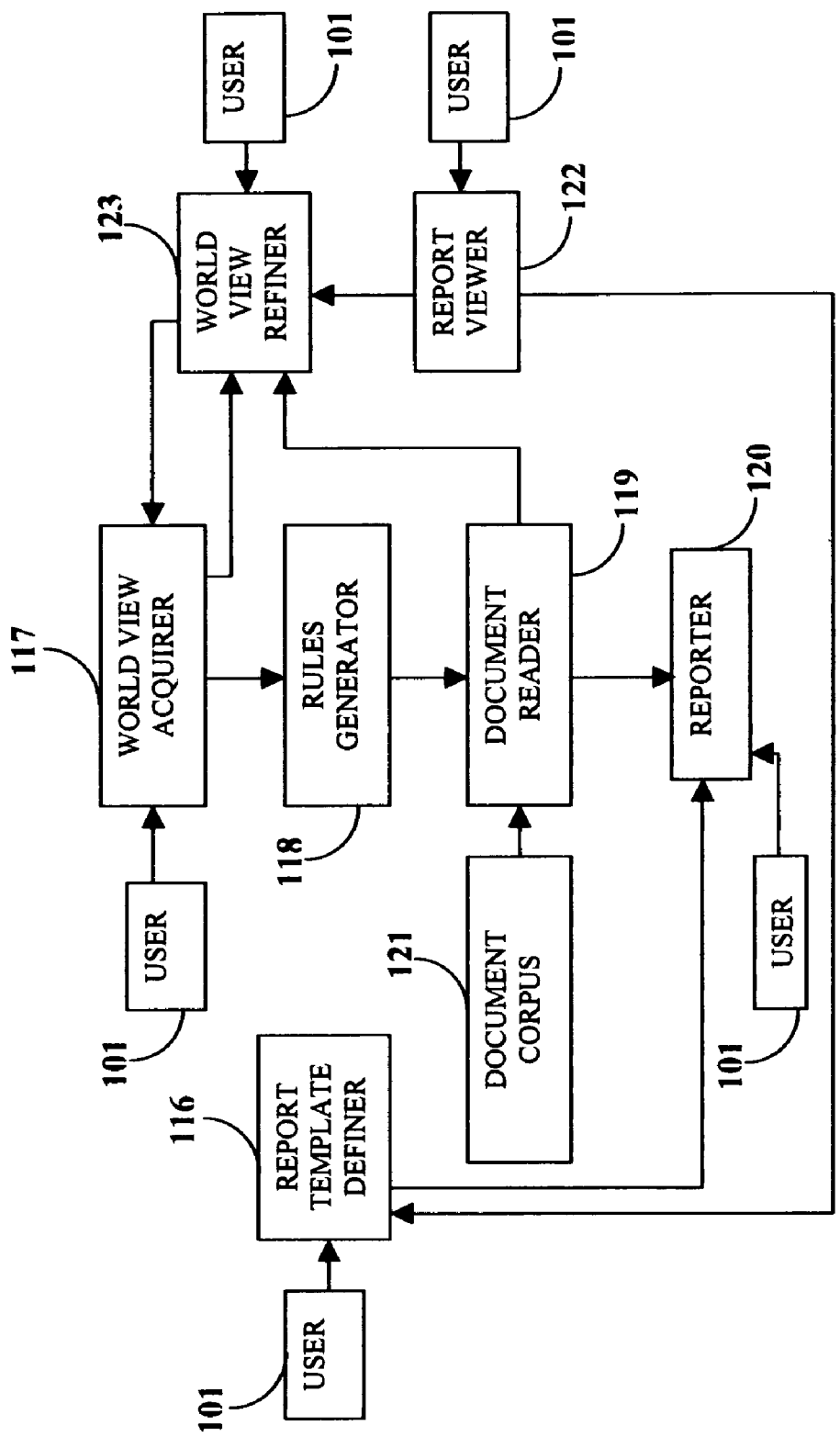
FIG. 1B illustrates the architecture of the reading style (RS) engine that implements the processes described under FIG. 1A.

FIG. 1B illustrates the architecture of the RS engine that implements the processes described under FIG. 1A. The rules generator 118 generates rules based on the private ontology 104, reading style and reading plan acquired by the worldview acquirer 117. The user 101 applies the report template definer 116 to generate a customized report template.

The document reader 119 reads documents from a document corpus 121 and applies the rules generated by the rules generator 118 on the corpus. The document reader 119 thereafter outputs the harvested information to the reporter 120. The reporter 120 uses the report template defined by the report template definer 116 and uses the output from the document reader 119 to generate reports that are displayed to the user 101 on a report viewer 122. The user refines the worldview using the worldview refiner 123. Examples of report viewers include a computer display screen, display screen of a personal digital assistant, etc.

Figure 2A:
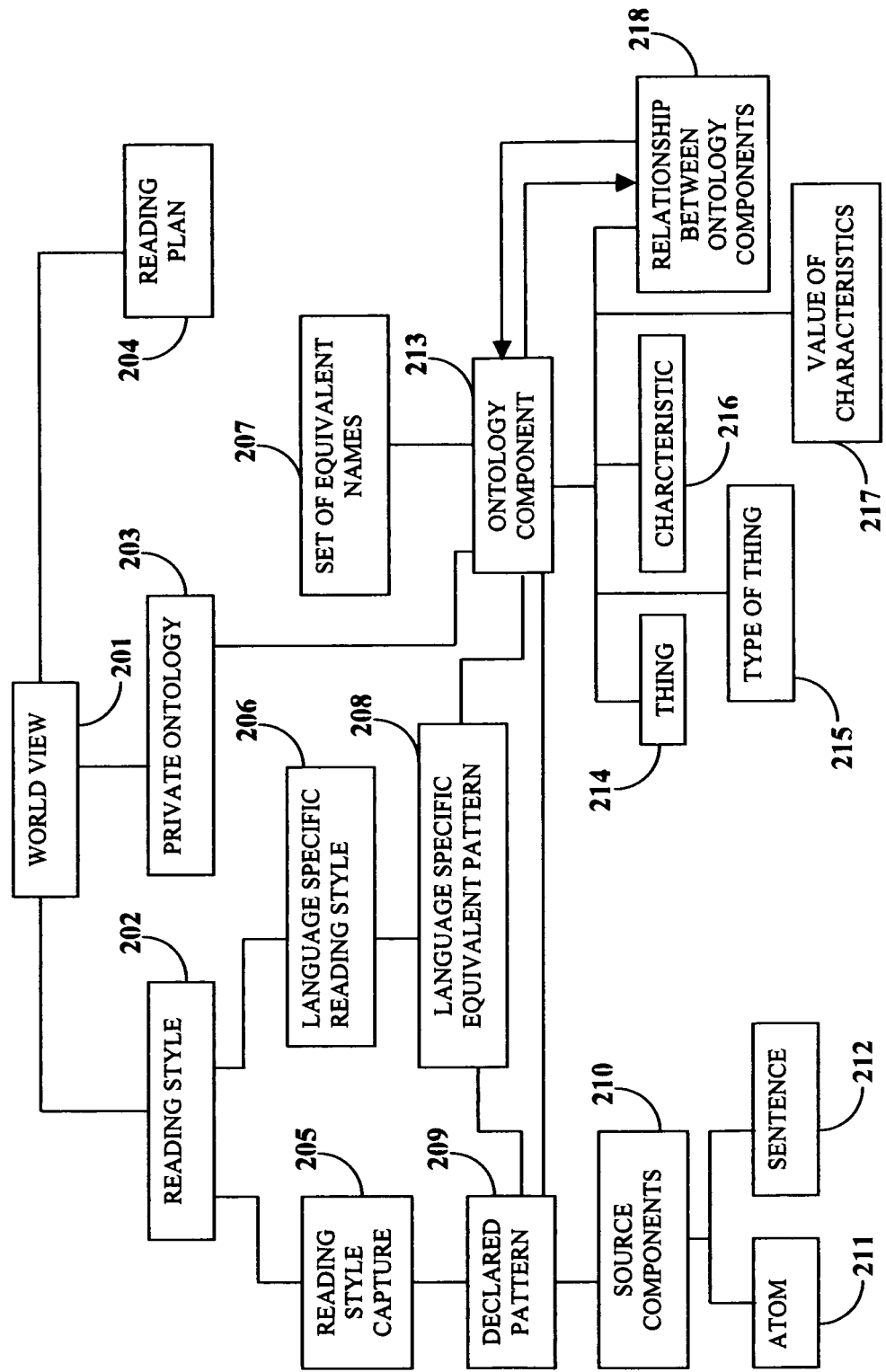
FIG. 2A illustrates the architecture of the worldview.

FIG. 2A illustrates the method of creating the reading style, reading plan and private ontology of a user. The creation of the worldview 201 comprises the creation of the reading style 202, private ontology 203 and reading plan 204 of the user. The reading style 205 is a set of one or more declared patterns 209. A declared pattern contains a set of source components 210. A pattern identifies a specific ontology component. The user declares patterns from source components and thereby captures the reading style. There are different kinds of source components such as atoms 211, sentences 212, paragraphs, etc. Each source component has a relation with another source component in a declared pattern.

A pattern contains one or more elements that are identified by a user. Examples of elements include words and phrases. Note that the sequence of elements is captured in the reading style. As the reading style is being captured, the private ontology is generated in parallel. The declared pattern identifies the ontology components of the private ontology of the user. The ontology components 213 include things 214, types of things 215, characteristics 216 of types of things, value of characteristics 217 and the relationships between the ontology components 218.

Consider an example of a pattern with the following two components: Andre Agassi and Wimbledon. Andre Agassi is a thing. Andre Agassi is a "sportsman", which is a type of thing. The characteristic of the type of thing is "Wimbledon player". The value of the characteristic is "runner-up in Wimbledon". The relationship between Andre Agassi and Wimbledon is "player", which is another component identified by the user. Each thing has an equivalent name set 207 within a specific language. Hence, in the capturing of language specific reading style 206, language specific equivalent patterns 208 are generated using the declared patterns. For example, in the English language, the user could select the following equivalent name set for "sportsman": player, champion, tennis player, athlete, etc. The user manually creates or selects a set of equivalent names for each thing he or she is interested in. Each language has its own rules for creating patterns. An example of these rules is grammar-based rules. Hence, from one declared pattern, multiple language specific equivalent patterns 208 are generated.

The reading plan 204 of the user is then captured. For example, consider user Joe Smith, a Wall Street financial analyst. Joe skips the prose sections within a financial article and focuses on the tabulated section within the article that contains revenue figures. The reading plan of Joe comprises the method of skipping the prose section and reading only the tabulated section.

The RS engine now uses these multiple equivalent patterns to determine the information of interest 110 of the user Joe Smith 101.

Figure 2B:
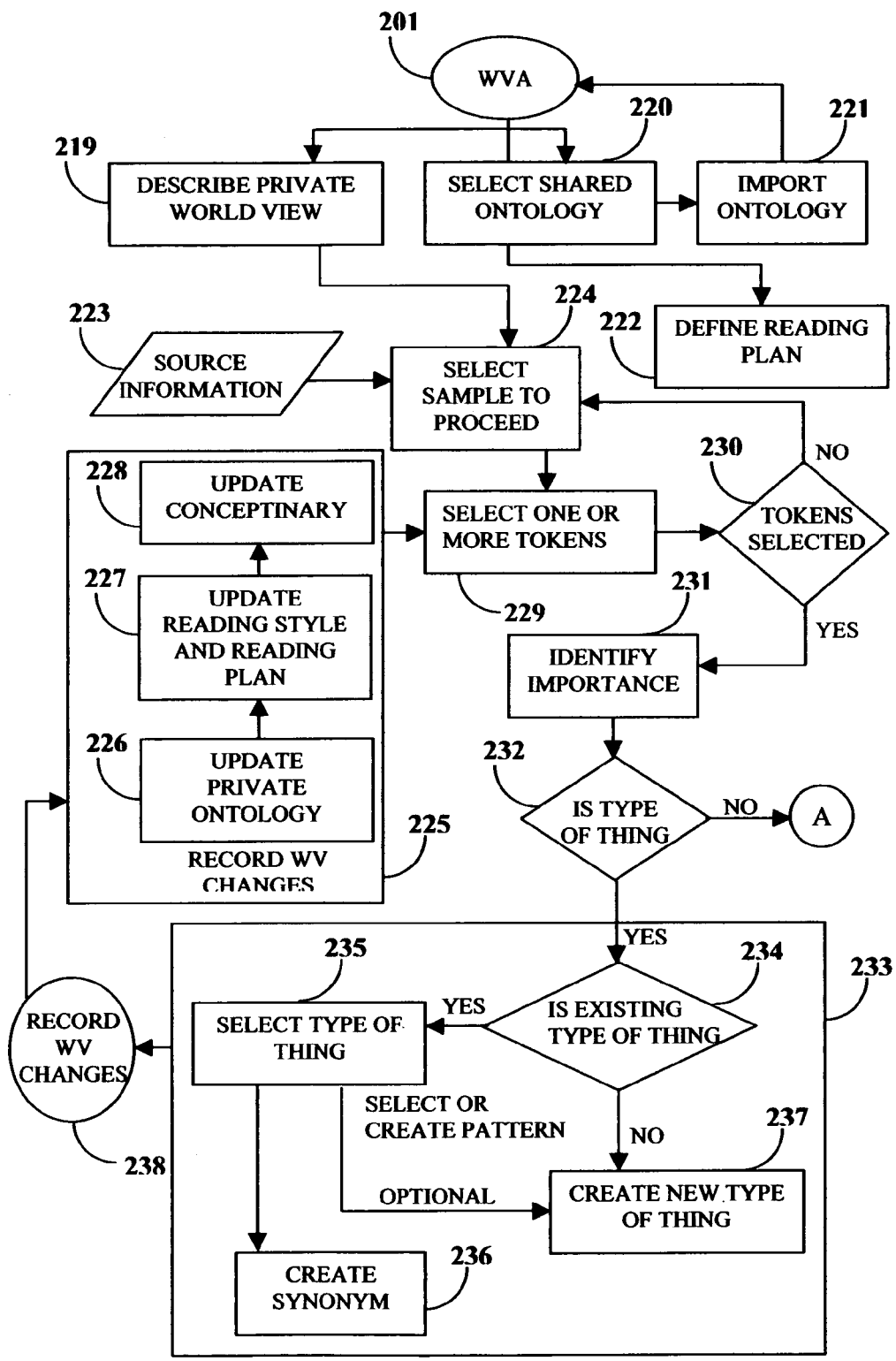
FIG. 2B illustrates the method of creating and updating the worldview of a user. Three options are provided to acquire the worldview of the user.

FIG. 2B illustrates the method of creating the worldview of a user. Three distinct options are provided to acquire and update 225 the worldview (WV) 201 of the user. One option is to select a shared ontology 220 from an external source and thereafter import the selected ontology 221. The second option enables the user to describe and input their private worldview 219. The third option is to define a reading plan 222 of the user.

A sample source document is displayed to the user for the purpose of marking up information of interest within the document 223. The user then selects 224 one or more words, i.e., tokens that are of interest in the example source document 229. The user then defines the importance 231 of the selected tokens 230.

Next, the user determines if the select token(s) is a "type of thing". If the selected token is a type of thing 232, classify the type of thing 233 and define the information of interest around the type of thing. If the "type of thing" already exists 234, the type of thing is selected 235 and synonyms are generated 236 for the selected "type of thing". If the "type of thing" does not exist 234, create a new "type of thing" 237. The information captured by the user on the "type of things" is used to update the user's private ontology 226, reading style reading plan 227, and conceptionary 228.

A conceptionary is a library that contains information on how words or phrases in a given language are related to concepts. The conceptionary provides the ability to map concepts across languages. The conceptionary also provides the ability to identify or establish linkages between concepts or types of things within a language. For example, the word "deja vu" in French represents a concept. This concept is not represented by a single word or short phrase in the Indian language Hindi. "Deja vu" can only be mapped to an entire sentence in Hindi that fully embodies its underlying concept. The conceptionary 228 is updated by capturing such user's inputs.

The following example illustrates the method of acquiring the worldview of a user utilizing the user's reading style. User Elizabeth desires to learn about desserts that can be prepared using green apples as one of its ingredients. Elizabeth selects an example source document that describes an American dessert that uses green apples. This text based source document resides on the internet and the document is about the preparation of the most popular American desserts. One section of this document contains the recipe for an apple pie. Elizabeth then identifies the words or phrases of interest in the document. Elizabeth's words of interest include "apple", "apple pie" and "dessert". She then identifies the importance to each of the aforementioned words, wherein the importance is the selection of the semantic item that represents the selected words. Next, Elizabeth classifies the chosen word "dessert" as a type of thing. She performs this classification either by selecting a type of thing among a range of options provided by the library of type of things, or by creating a new type of things. Multiple such selections and categorizations are made by Elizabeth for all her chosen words and phrases of interest. For example she will identify "apple pie" as a thing, with type "dessert" or, possibly, subtype "fruit pie"; she may identify "apple" as a thing, with type "fruit". Her chosen "types of things" and the manner in which these types of things are related are used to update her worldview. For example, she will identify "ingredient of" relation between "apple" and "apple pie". By applying Elizabeth's worldview, the RS engine will provide Elizabeth information on desserts that can be made using apples or other desserts that can be made using apples. Note that the RS engine will not present Elizabeth documents with information on how to grow apple trees. The use of apples in desserts is the area of interest, but the method of growing apples is not the desired information of interest for Elizabeth.

Figure 2C:
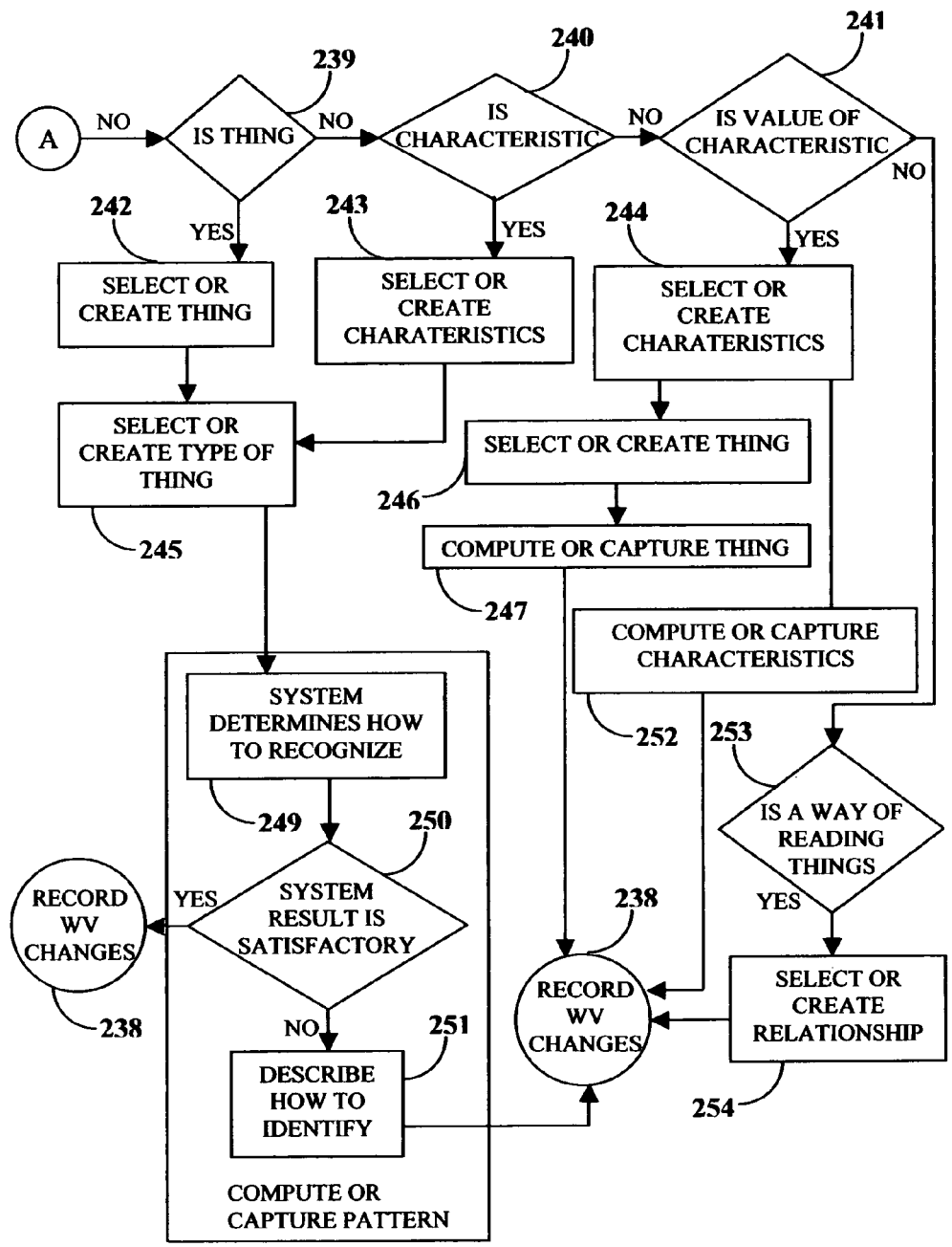
FIG. 2C illustrates the method of creating and updating the worldview of a user, a continuation of the method illustrated in FIG. 2B.

FIG. 2C is a continuation of the method illustrated in FIG. 2A and illustrates the method of updating the worldview of a user. If the selected token is not a type of thing 239, the user determines if the token is a thing, a characteristic 240 or value of characteristic 241. If the token is a thing, the user selects the thing, or creates the type of thing 242. The RS engine attempts to recognize the type of thing. If the RS engine is able to recognize the type of thing, it displays the recognized type. If the RS engine is unable to recognize the type of thing, or if the user finds the recognized type to be incorrect, the user describes the method to identify the type of thing and the captured pattern 248 described by the user is recorded in the worldview 238.

If the token is a characteristic, select the thing or select or create the characteristic 243. Select or create the type of thing 245. Again, the RS engine attempts to recognize 249 the type of thing. If the RS engine is able to recognize the type of thing 250, it displays the recognized type. If the RS engine is unable to recognize the type of thing 251, or if the user finds the recognized type to be incorrect, the user describes the method to identify the type of thing and the described pattern is recorded in the worldview 238.

If the token is the value of a characteristic, select or create the characteristic 244, followed by the steps of selecting or creating things 246 or computing and capturing type of things 247 and compute and capture characteristics 252. If the selected text is a way of relating things 253, select or create relationships 254 and record the changes to the worldview.

Figure 2D:
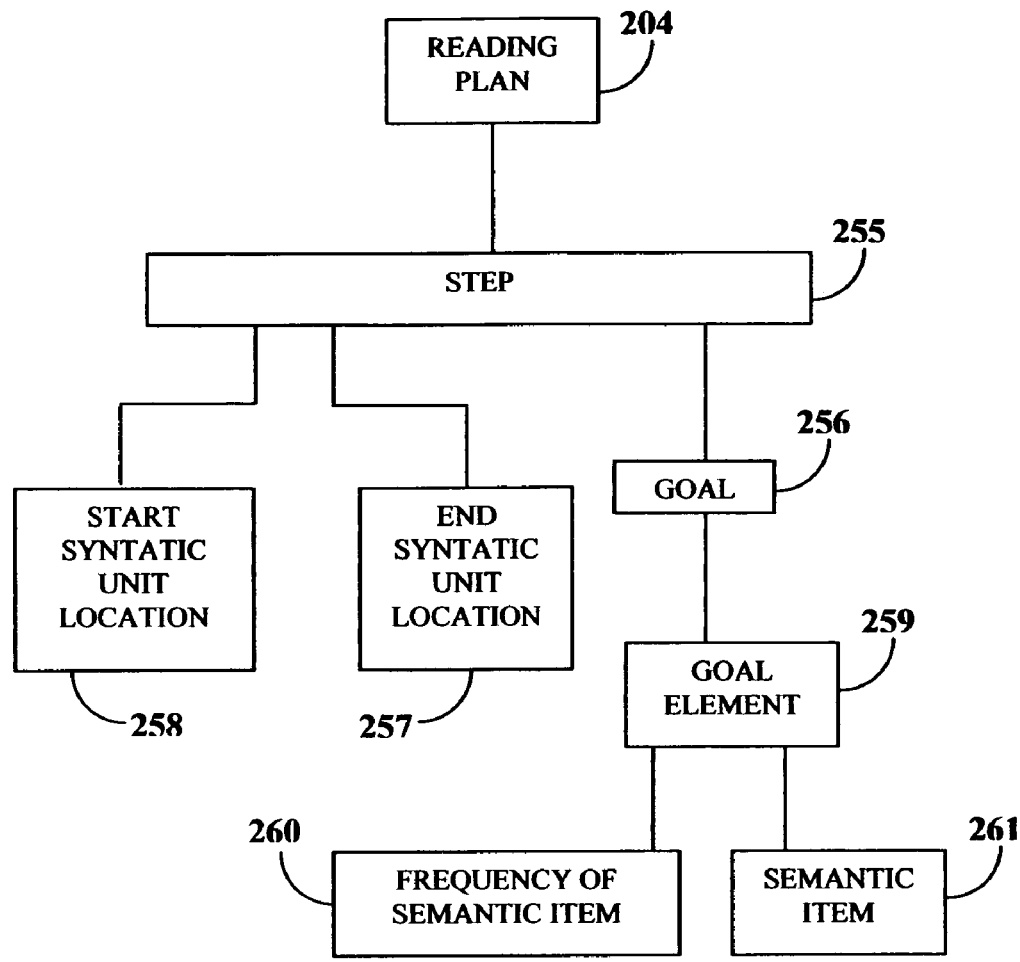
FIG. 2D illustrates the components of the reading plan.
Figure 2E:
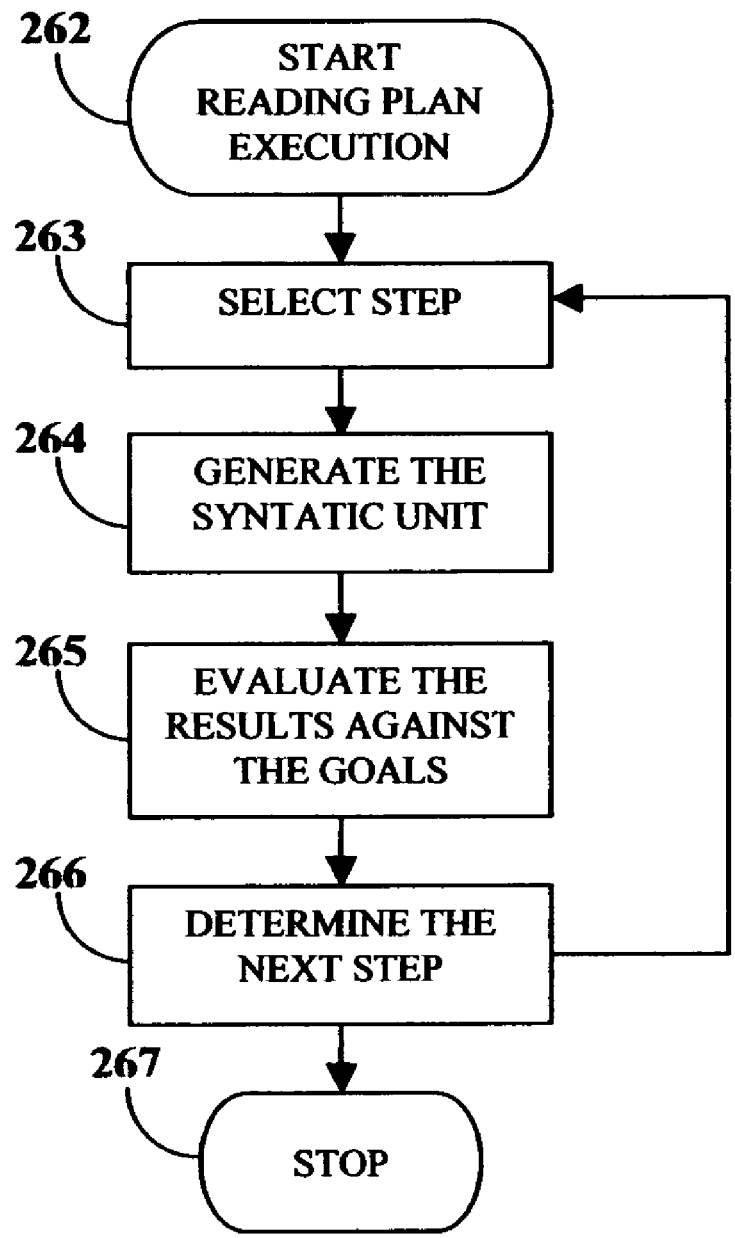
FIG. 2E illustrates the processes that constitute the reading plan.

FIG. 2D illustrates the components of a reading plan. FIG. 2E illustrates the processes that constitute the reading plan. The start of the reading plan 204 execution 262 is a set of steps 255 defined and selected 263 by the user that identifies and controls the evaluation sequence of a source document. The reading plan 204 allows for efficient processing of source documents by reducing the amount of data to be evaluated. A reading plan step 255 consists of a set of goals 256 each of which specifies the selection of the subsequent step to be executed. Every reading plan step has a start point and an end point. The start point 258 and end point 257 are syntactic units. Using these points, a new syntactic unit is extracted or generated 264 from input source document. A reading plan step goal, or goal 256, specifies one or more goal elements 259. Each goal element specifies the frequency 260 and kind of semantic items 261 that when found during the evaluation of the syntactic unit, satisfies the goal 265. The first goal 256 satisfied in the sequence of goals specifies the subsequent step 266 to be executed. It may also specify that the evaluation of this document be terminated. If no goal 256 is satisfied, then evaluation of this document is terminated 267. The defined sequencing of steps in a reading plan represents a directed acyclic graph (DAG). For example, consider a reading plan comprising of two goals. One goal element is that the frequency of occurrence of the word "religion" is to be greater than two. The second goal element is the presence of sequential occurrence of the words "secular" and "USA". In this example, the first syntactic unit is defamed to be the start of the first paragraph and the second syntactic unit is defined to be the end of the second paragraph. The processes implemented by the reading plan are described hereafter. The text in first and second paragraph is extracted and the frequency of occurrence of the word "religion" is determined within this extracted text. Next, the sequential occurrence of the words "secular" and "USA" is determined within the extracted text. If there is a sequential occurrence of these words, then the reading style of the user is applied on the text in first and second paragraph to determine the information of interest of the user.

Figure 3A:
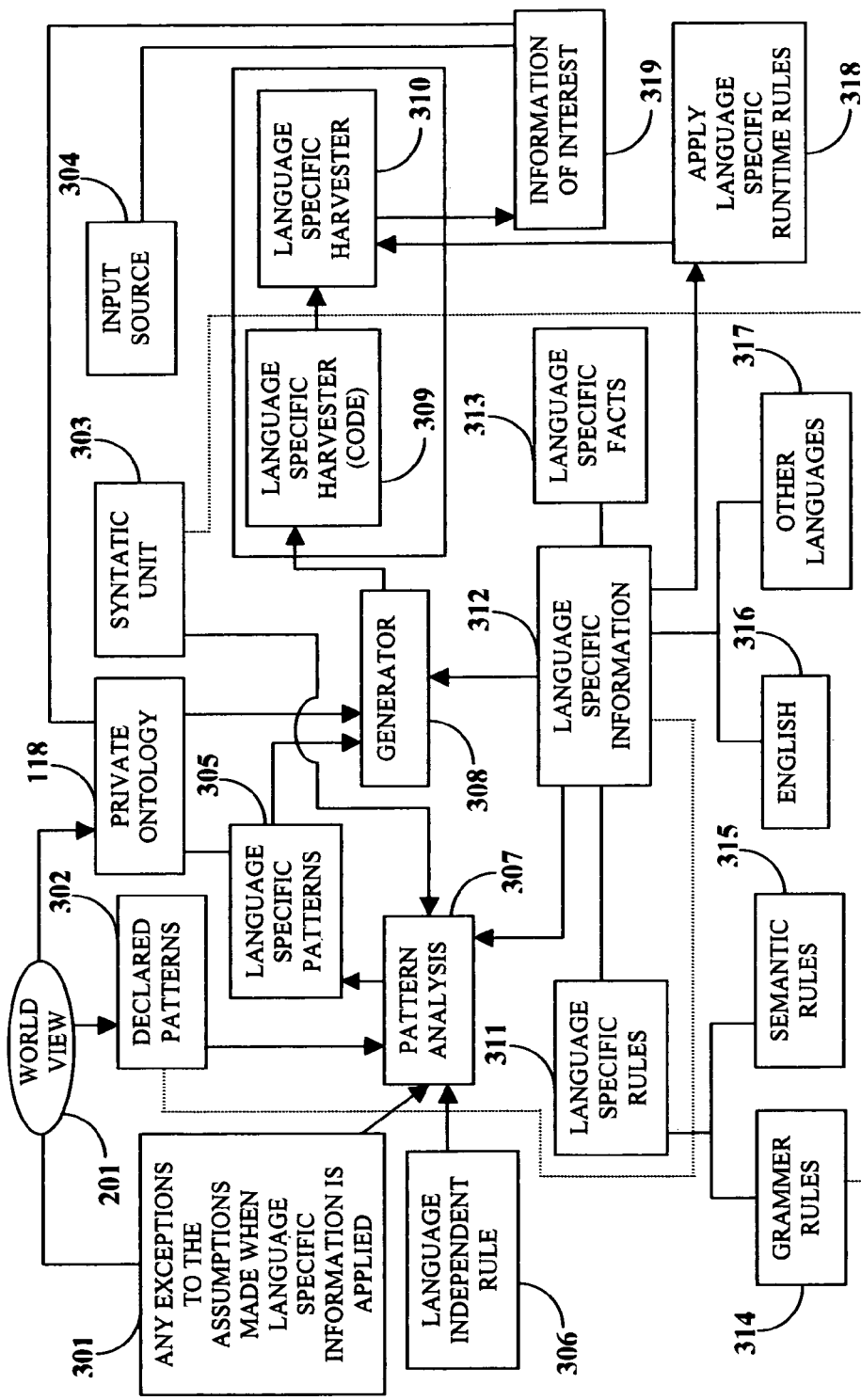
FIG. 3A illustrates the method of applying the reading style and private ontology of a user to determine the information of interest.

FIG. 3A illustrates the method of applying the reading style and private ontology 118 of a user 101 to determine the information of interest. A pattern analysis is applied on the document corpus using the declared patterns 302 of the reading style. The pattern analysis comprises the application of language specific rules 311 on language specific information 312, exceptions to assumptions in the application of language specific information 301, as well as the application of language independent rules 306. The language specific rules 311 include grammar rules 314 and semantic rules 315, derived from the syntactic unit 303. Language specific information 312 includes the types of language, such as English 316 and other languages 317 and language specific facts 313. A generator 308 generates the language specific harvester code 309, which becomes the language specific harvester 310. The language specific harvester reads the documents and extracts the information of interest. The generator 308 converts language specific patterns 305, private ontology 118, language specific information 312 and application of language specific runtime rules 318, into language specific code. The language specific patterns 305 are derived from private ontology 118 and pattern analysis 307. The language specific harvester 310 determines the information of interest 319 from the input source 304.

Figure 3B:
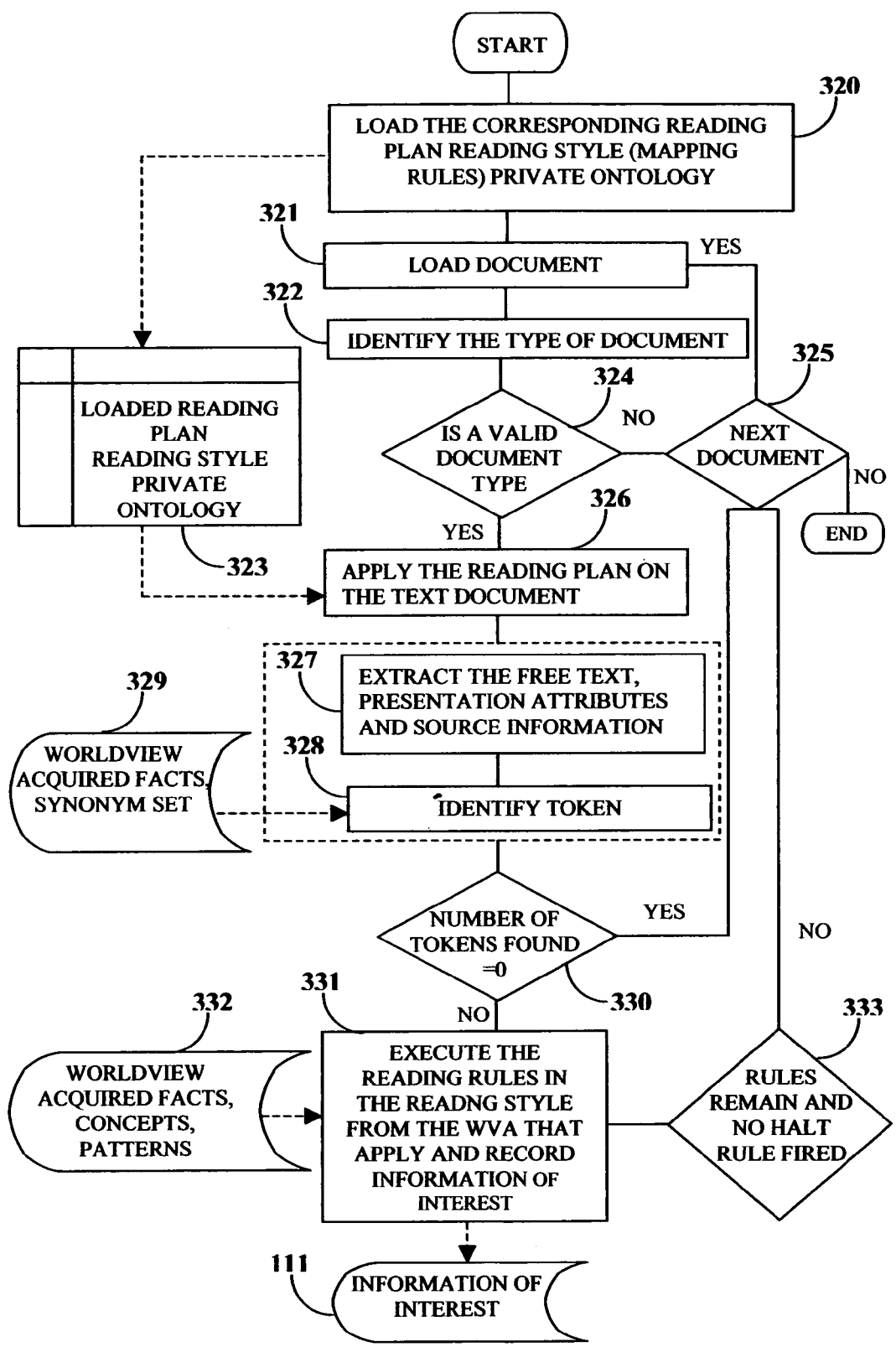
FIG. 3B illustrates in detail the method of applying the reading style, reading plan and private ontology of a user to determine the information of interest.

FIG. 3B illustrates in detail the method of applying the reading style, reading plan and private ontology of a user to determine the information of interest. Load the reading plan, reading style and the private ontology of the user into the RS engine 320. Load the document 321 from which information is to be harvested. Identify the type of document 322 and determine if the document is of a valid type 324. For example, an audio file is not a valid type of text document from which information can be harvested. If the document is not valid, select another document 325 from the information source and again determine if the document is of a valid type. Load the reading style, reading plan and private ontology 323 and apply the same on the valid document 326. The reading plan identifies those specific sections of the documents that the user is typically interested in. The reading plan states the order in which each statement is read in a document and the conditions for reading the statement. 327. Tokens of information of interest were determined 328 in the earlier stage of worldview acquisition, and were described previously under the explanation of FIG. 2. Use these tokens from the worldview acquired facts and the corresponding synonym sets 329. Search and identify these tokens in the valid document. If there are no tokens found in the free text of the document, select a new document and repeat the process of applying the reading plan, extracting the free text, presentation attributes and source information 327, and identifying tokens 328. If one or more tokens are found 330, apply the worldview acquired facts, concepts and patterns 332 to the free text that contains the token(s). Apply the reading style determined in the worldview acquisition stage, and derive the desired information of the user 331. Capturing of the reading style has been described under the explanation of FIG. 2. The private ontology significantly contributes to the identification of the information of interest 111 in the document. Process the reading rules until there are no further activities 333.

The following example illustrates the method of applying the reading style of a user. Consider Mary who is interested in information relating to "green pepper". In the worldview acquisition stage, described earlier under the explanation of FIG. 1, the following parameters have already been identified: token(s), reading plan, reading style, private ontology, synonym set, worldview acquired facts, concepts and patterns. The token word used for information harvesting is "green pepper". Mary's reading plan is defined by the following: Mary typically reads and harvests information only from the ingredient content sections of the cooking related documents authored by Indian and American chefs. She skips the initial brief introduction and the generic prose in these documents. Mary's reading style is defined as follows by the RS engine: Mary typically reads cooking articles written by expert Indian and American chefs. Mary is only interested in spicy dishes. Mary's private ontology consists of the following elements: food, spicy, green pepper and their relationships. The synonym set for Mary's information search includes bell pepper, etc. The private ontology and worldview acquired facts, concepts and patterns are applied on a document corpus to determine her information of interest. Consider the case, wherein a hypertext marked up language (html) document from website www.xyz.com is first used for information harvesting. Assume that the document is authored by an Indian or American author; hence it is selected as a valid document type. The document contains the tokens "bell pepper" and "spicy", hence it is selected for further information processing. Next, the reading plan of Mary is applied on to the document, i.e., RS engine is harvested for information only from the section of the document that lists the ingredients and their relative proportions. The desired information, i.e., information on the ingredients and their relative proportions is presented to Mary.

Figure 4:
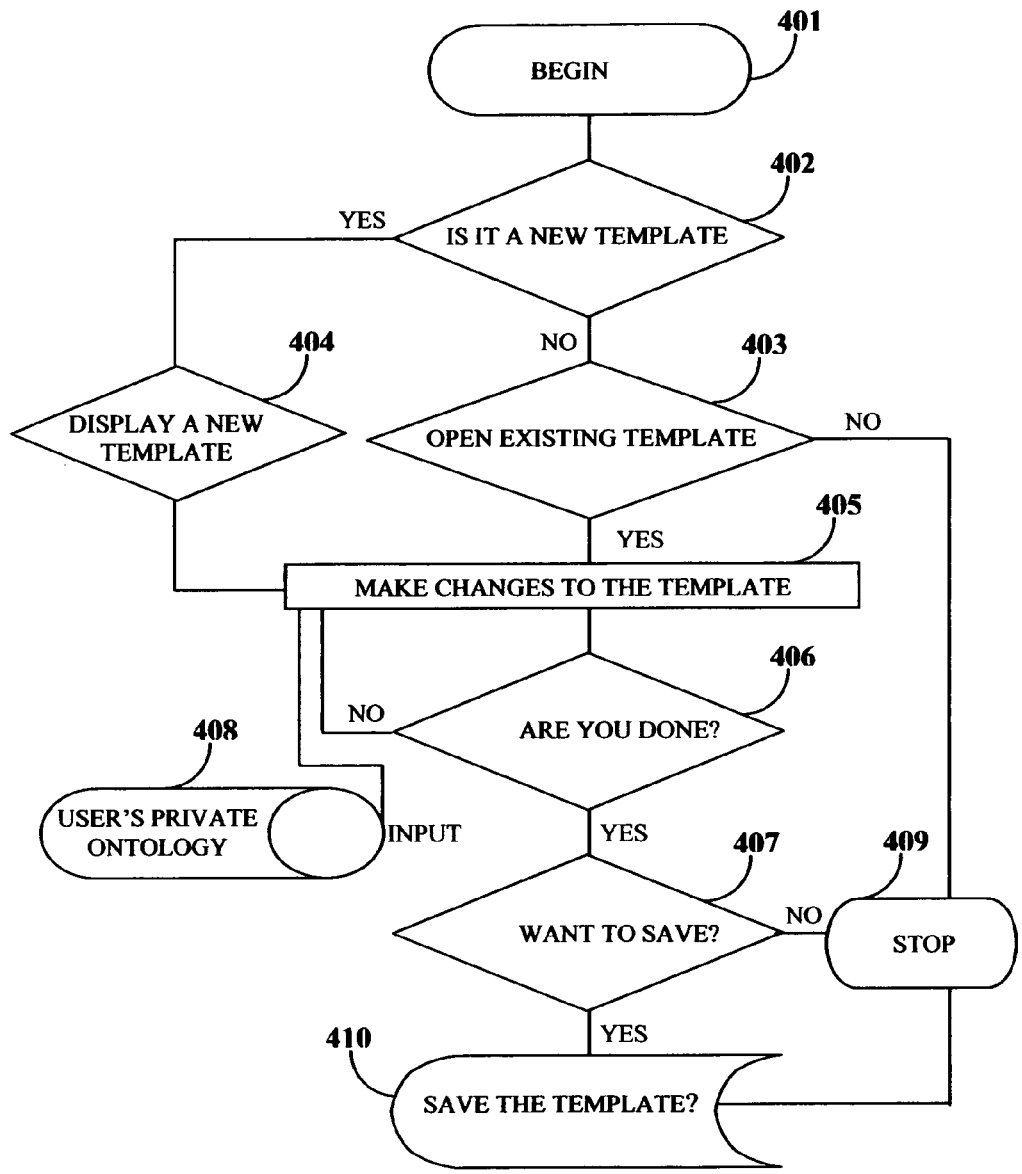
FIG. 4 illustrates the method of creating a report template.

FIG. 4 illustrates the method of creating the report template. Each report template has a predetermined structure. The report template is programmed to create a presentation report by filling in the parameters within the structured report. Ask the user if he or she requires a new template 402 or would prefer to open an existing template 403. If the user requires a new template, the RS engine displays a new template to the user. If the user is satisfied with the new template 404 displayed by the RS engine, the new template is added to the user's private ontology 408. If the user makes changes to the template 405, the RS engine checks if the user is finished 406 with the changes and queries the user on whether to save the changes 407. The user can either save the template 410, or the user can open a new existing template and repeat the above processes 409 if the user is not satisfied with the template. The created templates are saved in the RS engine for future use.

Figure 5A:
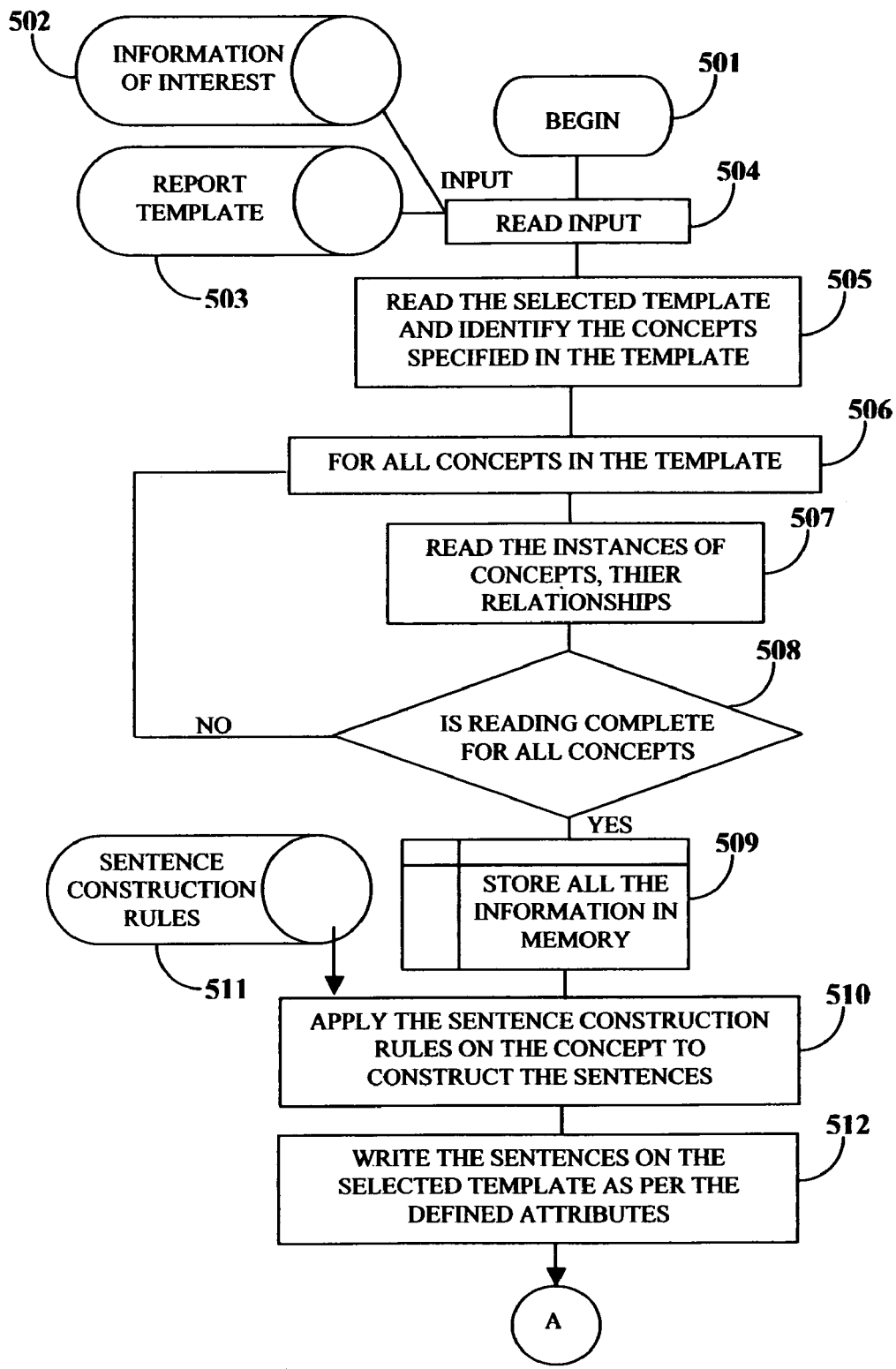
FIG. 5A illustrates the process of reporting the information of interest to the user, input of the information of interest and the report template.

FIG. 5A illustrates the process of reporting the information of interest to the user. Input the information of interest 502 and the report template 503 through the read input operation 504. Note that the user has already created the report template. The method of report creation has been previously described under FIG. 4. The RS engine reads the selected templates and identifies the concepts specified in the template 505. For all the concepts in the template 506, the RS engine reads the instances of the concepts and their relationships 507. If the reading is completed for all the concepts 508, store all the information in memory 509. Apply sentence construction rules 511 on the harvested information to construct sentences 510 using the stored information. Create a report by writing sentences on the selected template as per the attributes 512 predefined by the user.

Figure 5B:
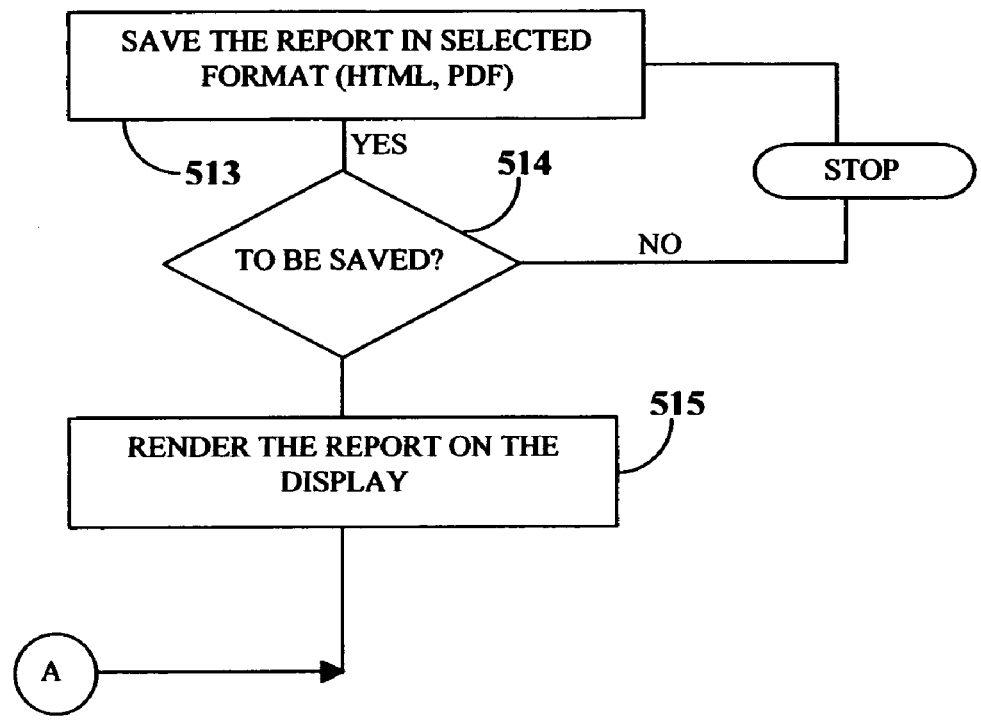
FIG. 5B, a continuation of FIG. 5A, illustrates the process of reporting the desired information to the user.

FIG. 5B, a continuation of FIG. 5A illustrates the process of reporting the desired information to the user. If the user places a request to save the report 513, 514, the report is saved 513 and subsequently displayed on a display to the user 515.

Figure 6A:
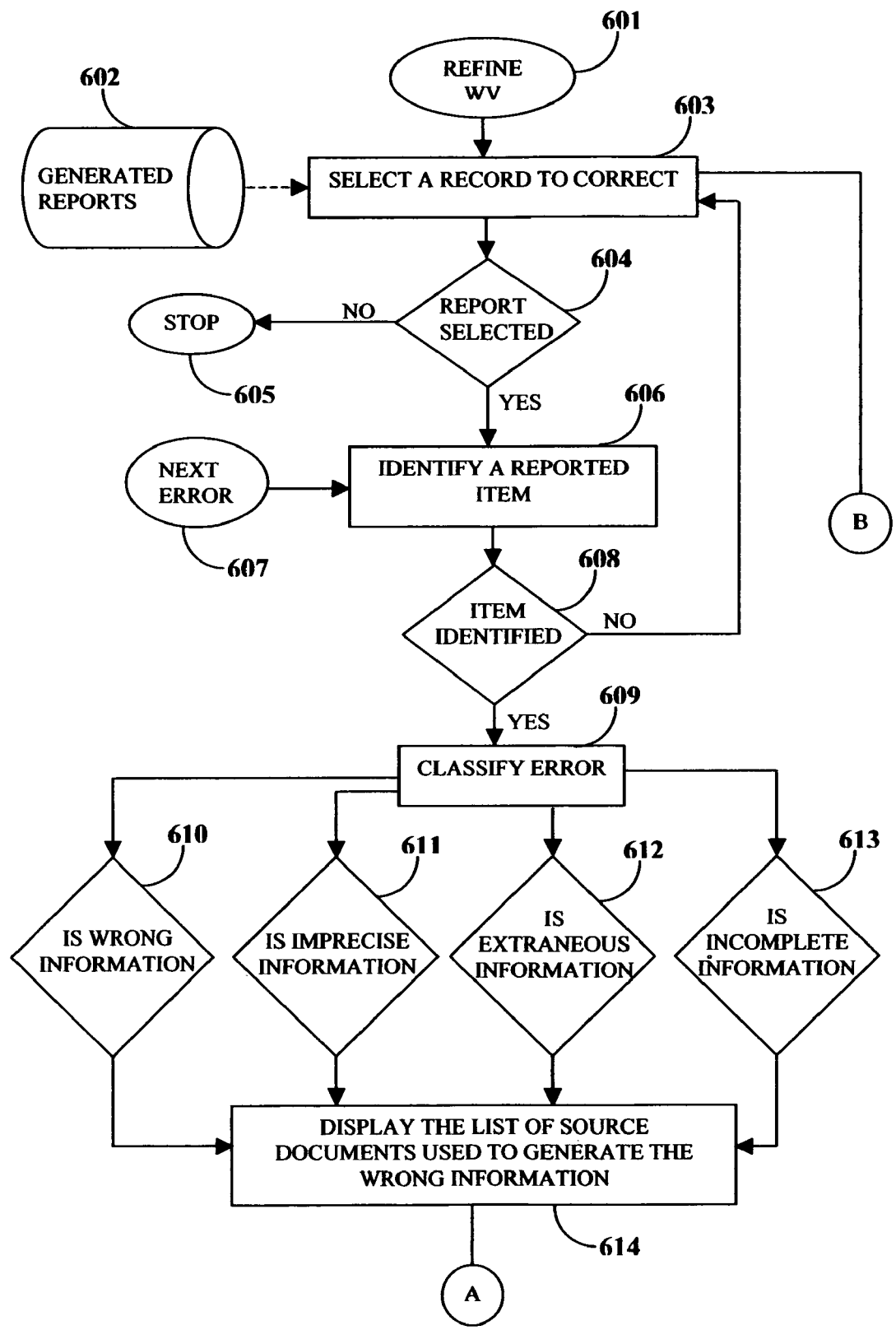
FIG. 6A illustrates the process of refining the worldview.

FIG. 6A illustrates the process of refining the worldview 601. The user selects record(s) to correct 603 within a displayed report. Note that the reports are generated 602 by the processes described in FIG. 5A and FIG. 5B. If no records are selected, the user stops the refine worldview activity 605. If a record is selected 604, the user attempts to identify the item of error in the report 606. If there is no report selected, stop the refine worldview process 605. If an error is identified 608, classify the error 609. The error is classified into one of the following categories: wrong information 610, imprecise information 611, extraneous information 612 or incomplete information 613. If more than one error exists, repeat the refine worldview process on the next error 607. Display the documents that were used in the process of generating the item of errors 614.

Figure 6B:
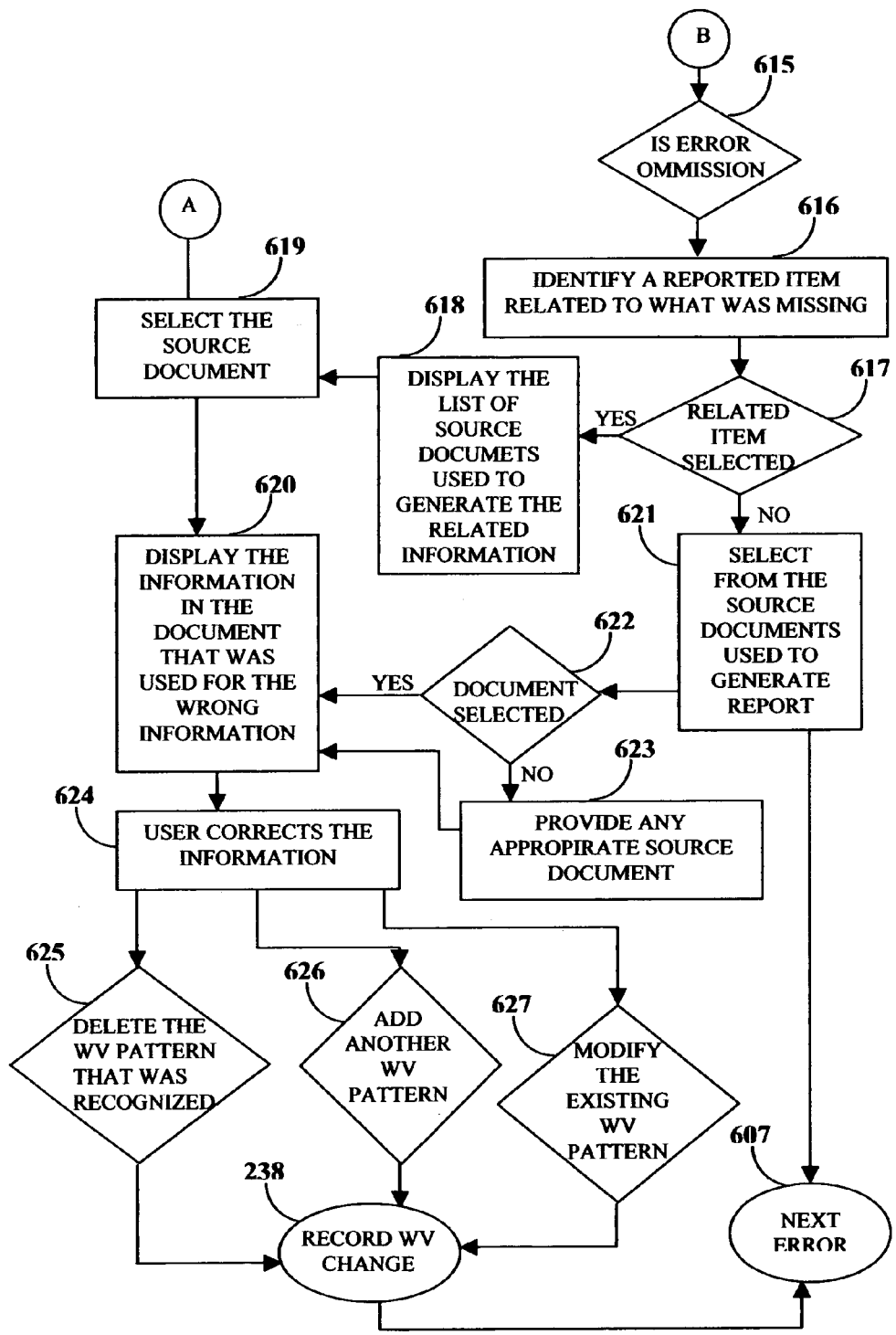
FIG. 6B, a continuation of FIG. 6A, illustrates the process of refining the worldview.

FIG. 6B, a continuation of FIG. 6A, again illustrates the process of refining the worldview. Display to the user the information in documents that contributed to generating the item(s) of error 620 from the selected source documents 619. The user then corrects the error 624. The user either deletes the worldview pattern that was earlier generated 625, adds a new worldview pattern 626, or modifies the existing worldview pattern 627, thereafter the changes to the worldview are recorded 238. The changes to the worldview are recorded. If the error is an omission 615, identify a reported item that is related to the omission 616. If the related item is selected 617 by the user, display to the user the list of source documents used to generate the related information 618. If the related item is not selected, select from a list of source documents used to generate the report 621. If no documents are selected 622, the user identifies and provides appropriate source documents 623. For example, the user may collect relevant documents for retrieving the information of interest by utilizing a web crawler. Repeat the process of refining the worldview for the next error 607.

Figure 7:
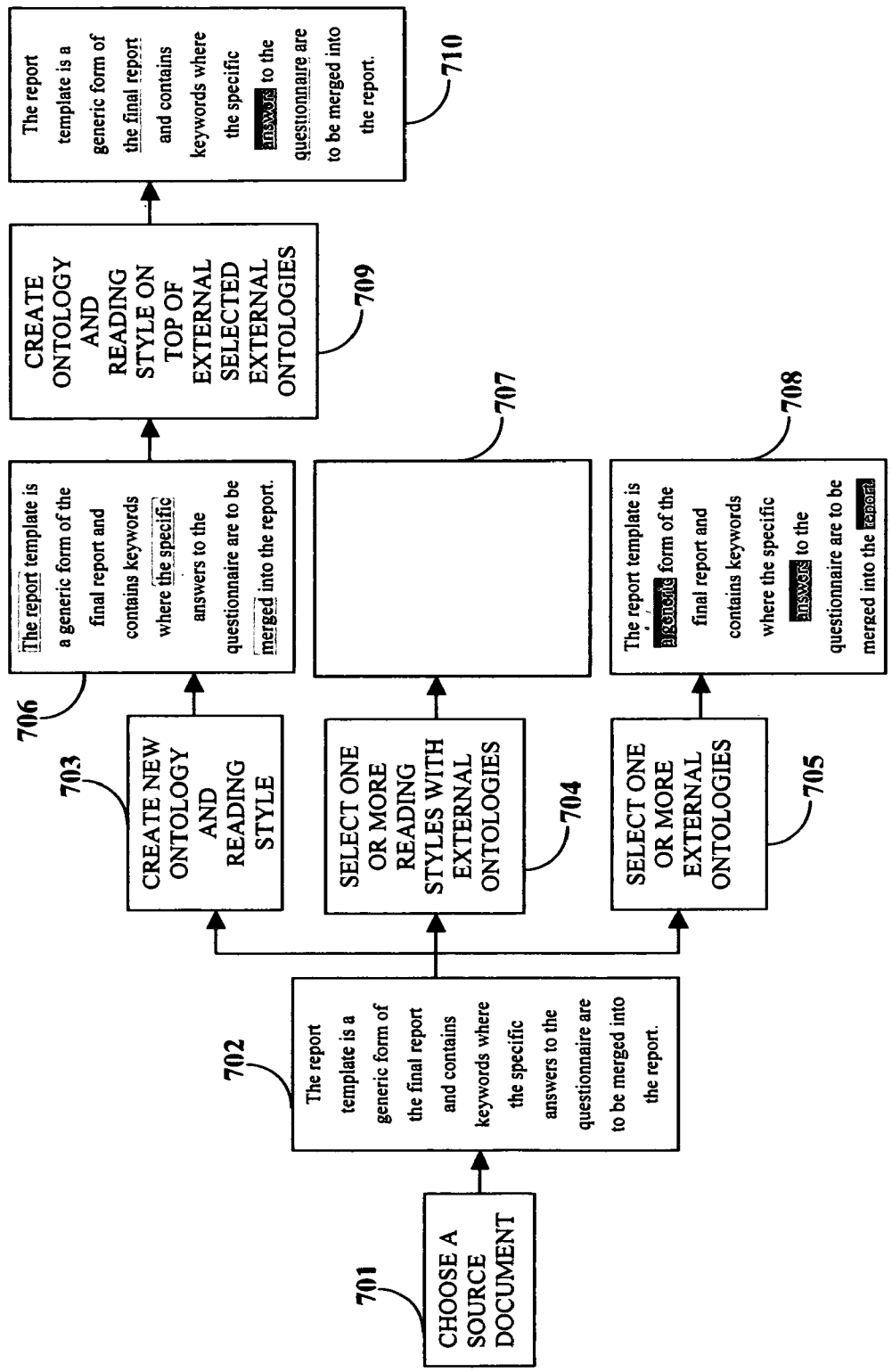
FIG. 7 pictorially illustrates the creation of a new ontology and reading style on top of externally created ontologies.

FIG. 7 pictorially illustrates the creation of a new ontology and reading style on top of externally created ontologies 709. A source document 702 is selected 701. Create a private ontology and reading style 703 and apply them on the source document 702. Select one or more reading styles 704 with external ontologies and apply them on the source document 702. Apply one or more external ontologies 705 on the source document. Create a new ontology and reading style on top of externally created ontologies. The highlighted sections in the document 706, 707, 708 and 710 represent the capture of the reading style.

Figure 8A:
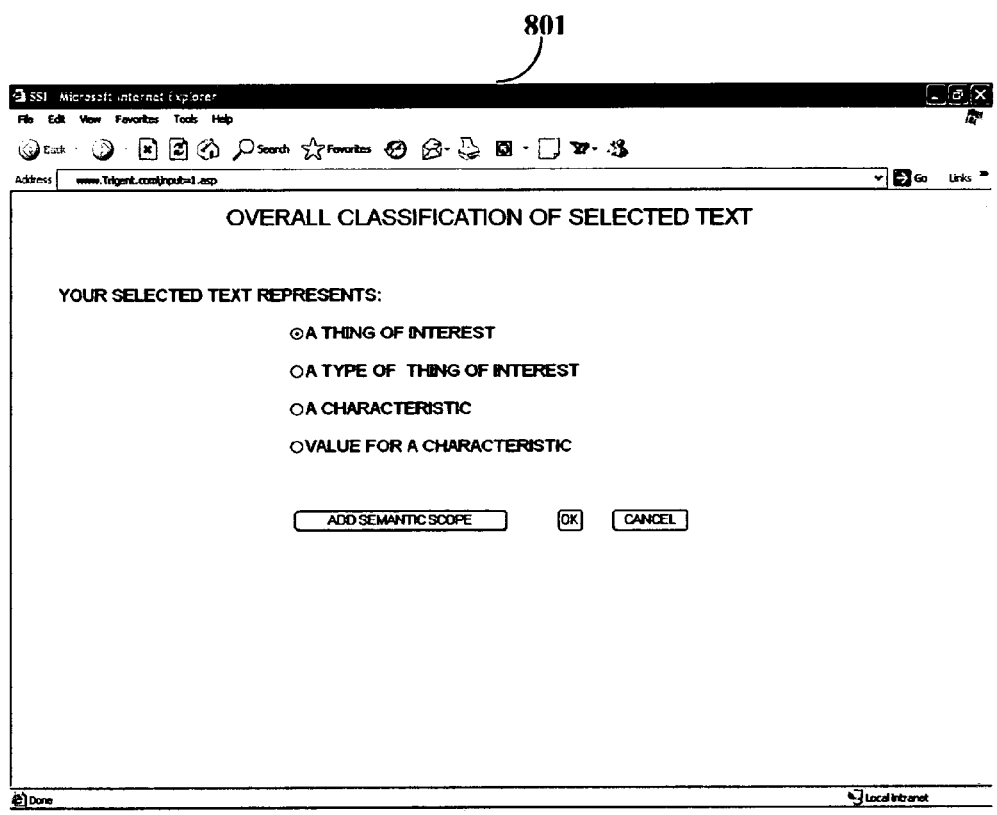
FIG. 8A illustrates the capture of the classification of a selected text by a user.

FIG. 8A illustrates the capture of the classification of a selected text by a user 801. The user selects text from within an information source. Once the text is selected, the RS engine requests the user to classify the text in one of the following: a thing of interest, a type of thing of interest, a characteristic, or a value of a characteristic. For example, if the user selects "finish 100 meter race in 9.57 seconds", i.e., the time taken by Johnson to run 100 meters, the selected text is classified as the value of a characteristic.

Figure 8B:
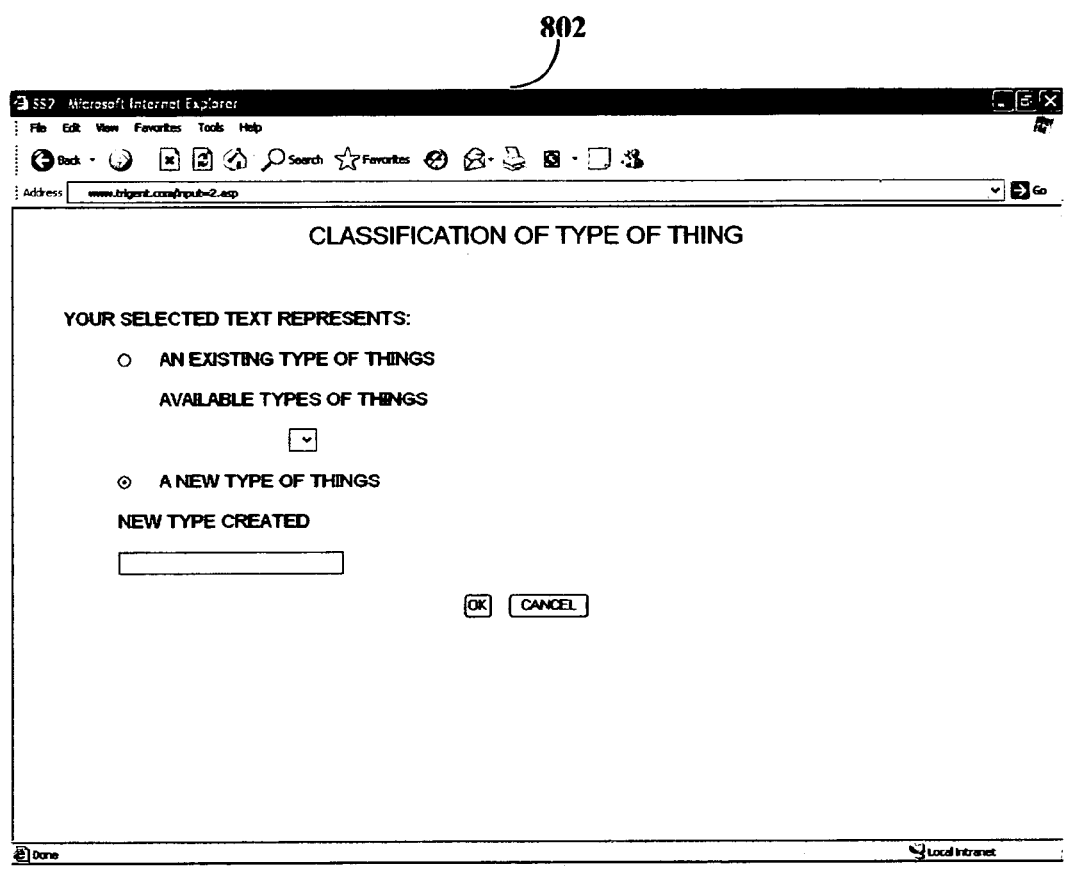
FIG. 8B illustrates the capture of the classification of a selected text by a user as a type of things.

FIG. 8B illustrates the capture of the classification of a selected text by a user based on the type of things 802. The user classifies the selected text as an existing type of thing, available type of thing or new type of thing. If it is a new type of thing, the user inputs the new type created. Consider the same example illustrated in FIG. 9A. The user classifies the text as an existing type of thing, i.e., a "sporting event".

Figure 8C:
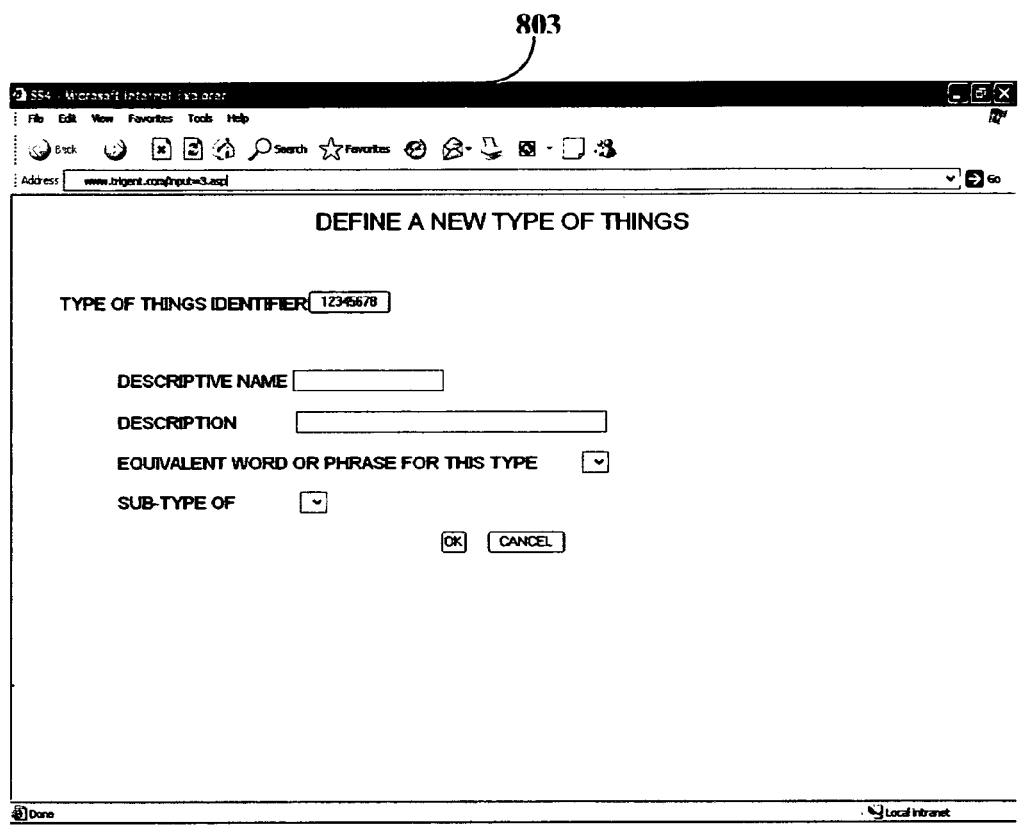
FIG. 8C illustrates the capture of the classification of a selected text by a user as a new type of things.

FIG. 8C illustrates the capture of the classification of a selected text by a user based on a new type of thing 803. The type of thing identifier is a numeric used by the RS engine to internally identify the type of thing. The descriptive name and description are inputted by the user. This information primarily helps the user in future recognition of the type of thing or thing or characteristic or value of characteristic as the case may be. The user may choose equivalent words for the new type of thing.

Figure 8D:
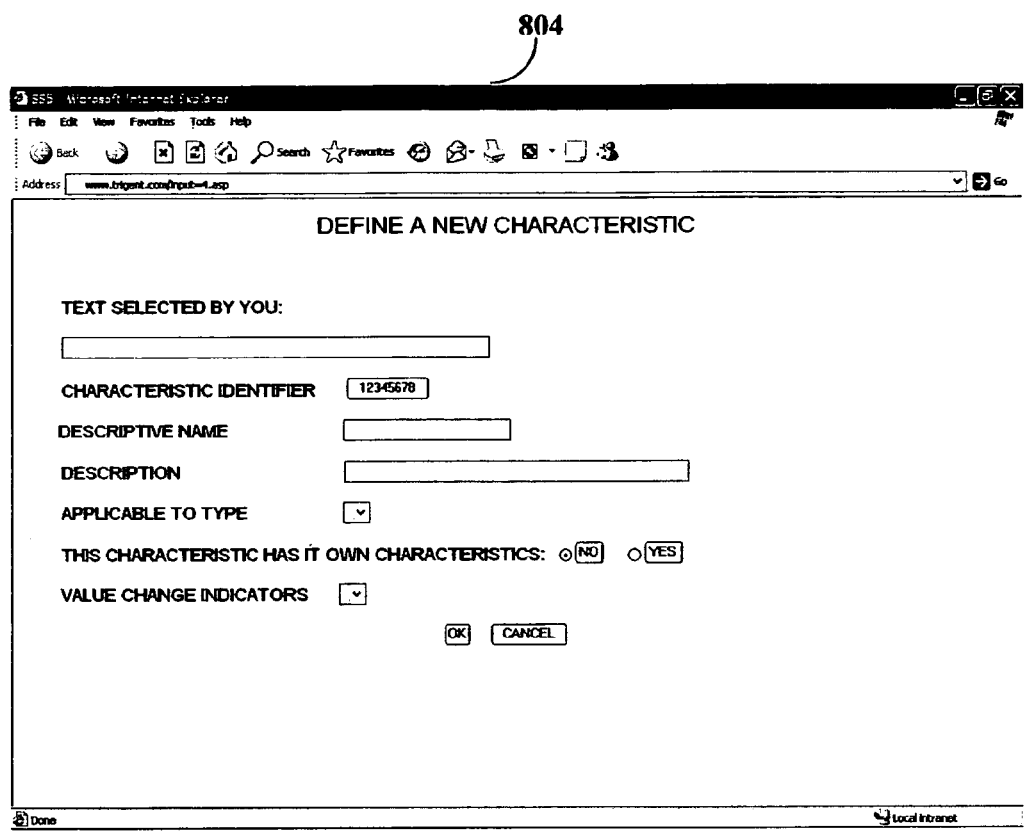
FIG. 8D illustrates the capture of the classification of a selected text by a user as a new characteristic of a type of things.

FIG. 8D illustrates the capture of a definition of a new characteristic of a selected text by a user 804. For example, if the selected text is "Mandarin dialect of Chinese language in China", the descriptive identifier can be "Mandarin dialect". The description can be "Mandarin dialect in China". It is applicable to the type "language". This type has its own characteristic "dialect". There are no value change indicators for this specific example. A value change occurs when a characteristic has changed. For example, if the capital of a country changes location over time, and the name of the capital is the characteristic, this characteristic's value has changed over time and needs to be recorded by the user.

Figure 8E:
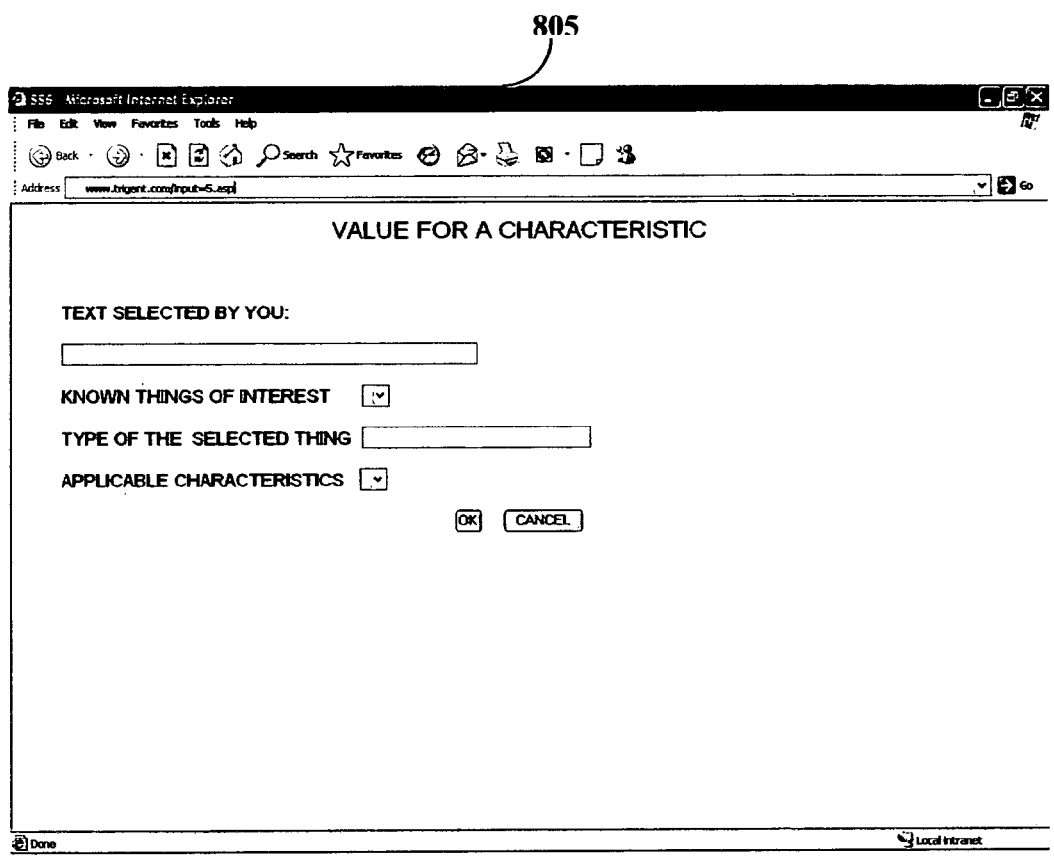
FIG. 8E illustrates the capture of the classification of a selected text by a user as a value for a characteristic of a new type of thing.

FIG. 8E illustrates the capture of a value for a characteristic of a selected text by a user based on a new type of thing 805. For example, for the selected text "time to finish 100 meter race is 9.57 seconds", the value of the characteristic for the time of finish is 9.57 seconds.

Figure 8F:
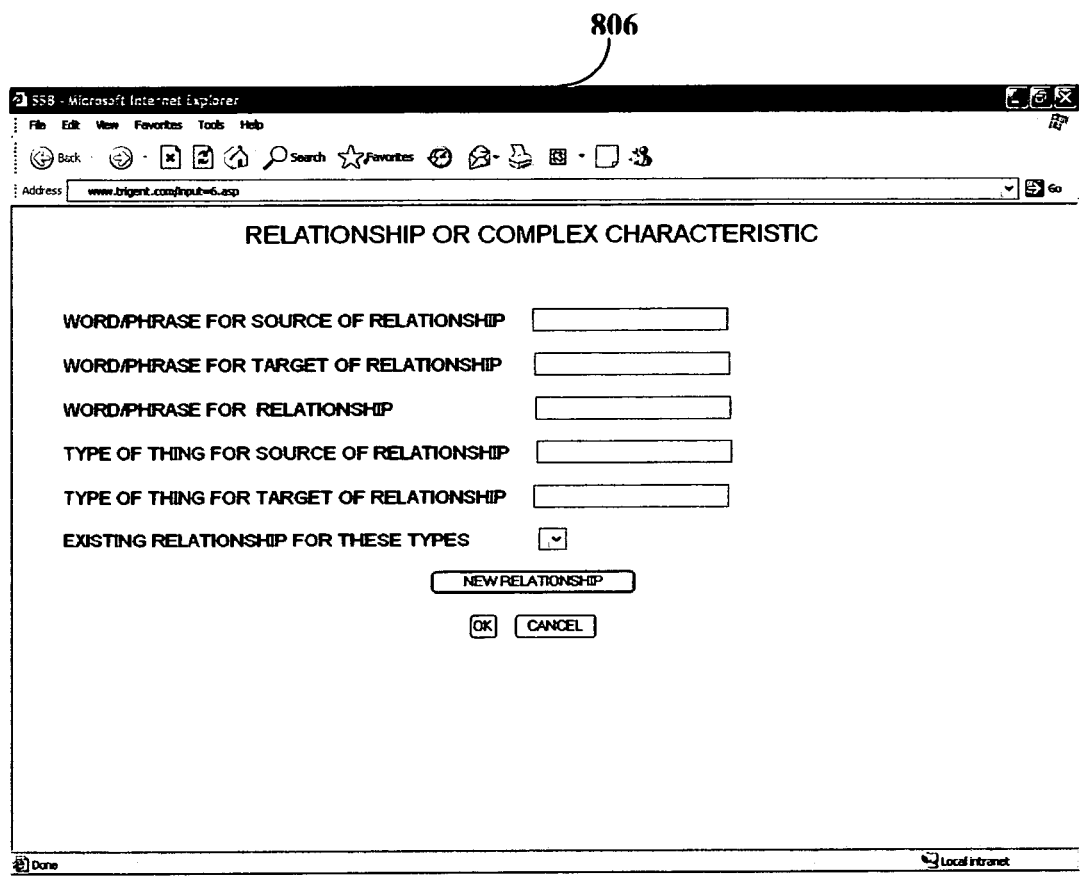
FIG. 8F illustrates the capture of the classification of a selected text by a user as a value for a characteristic of a new type of thing.

FIG. 8F exemplifies the capture of a value for a characteristic of a selected text by a user based on a new type of thing 806. Consider the sample text, "the city Washington DC is the capital of the country United States of America". The word or phrase for source of relationship is "city". The word or phrase for target of relationship is "country". The word or phrase for relationship is "the capital of". The type of thing for source of relationship is "city" and the type of thing for target of relationship is "country". The relationship identified can either be a new relationship or an existing relationship.

FIG. 8G exemplifies the definition of a new relationship 807. Consider the sample text, "the city Washington DC is the capital of the country United States of America". The type of thing for source of relationship is "city". The type of thing for target of relationship is "country". Consider another example, "Joe is the son of John", the source role name is "son of". The target role name is "father". Joe has only one father; hence the multiplicity value is one. The multiplicity value for the target role "father" can be greater than one, as a father can have more than one child. The equivalent words or phrases for this relationship could include the following: son of, child of, progeny of etc.

FIG. 8H illustrates a capture of the reading plan 808. When the information of interest is sparsely populated in a document containing a large amount of text, the implementation of a reading plan provides an efficient way of reducing the time and effort required for extracting the information of interest. The "goal of a reading plan—type of thing" identifies occurrences or instances of a type of thing. For example, the user may be interested on the "statements of the US President on China". If the RS engine finds instance of these statements in a certain section of the document, then analyze this section in detail. The "goal of reading plan—relationship" provides the relationship between the "type of things". Each user has his or her own reading plan. For example, the project manager might be interested in the time of completion of a project in a project summary document, whereas the finance manager may be interested in the payment schedule in the project summary document.

Figure 8I:
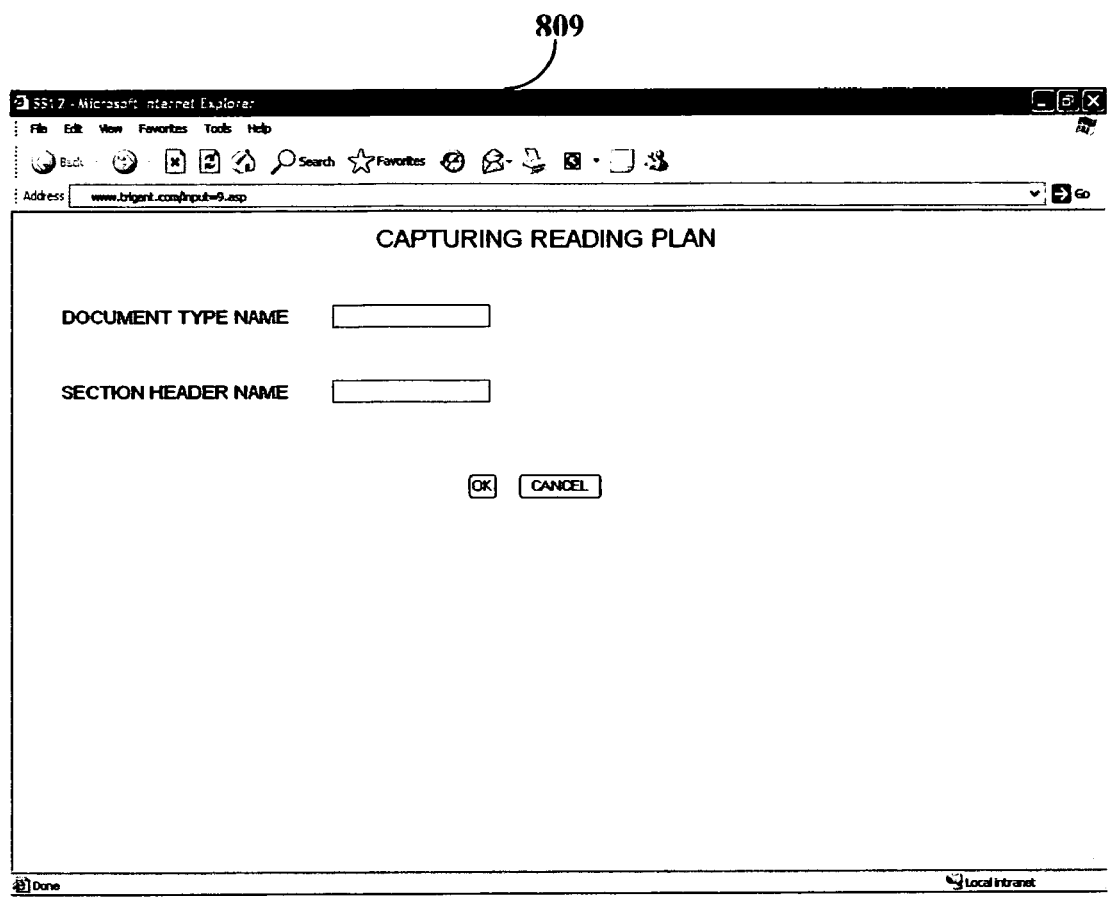

FIG. 8I illustrates a capture of the reading plan 809. The user may only desire to read certain type of documents. For example, the user may only be interested in reading documents that are "country profiles" and the section of interest may be "Malaysia".

Figure 8J:
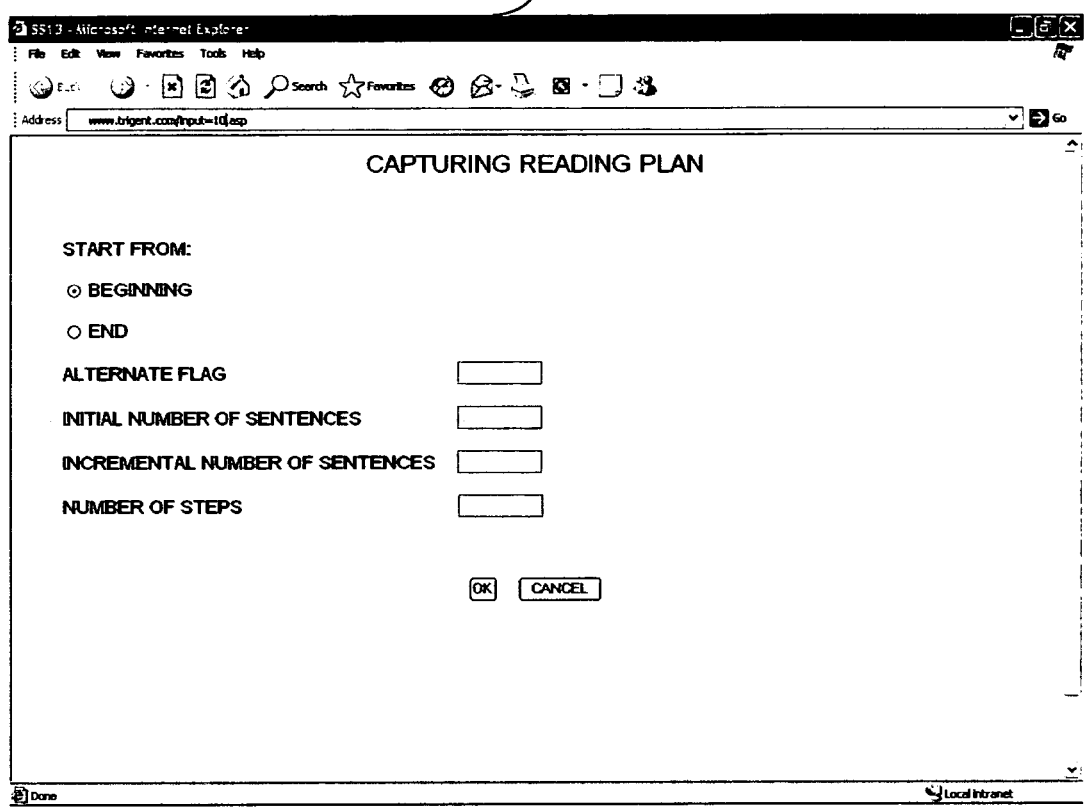

FIG. 8J illustrates a capture of the reading plan 810. For example, the user may only desire to read the beginning paragraph of a document or the ending section of a document. The user may only wish to read the first fifty lines. After reading the first set of sentences, if information of interest is found in the read section, then incrementally read another ten sentences. Repeat this process of incrementally reading not more than five times in a document. "Alternate flag" captures the manner of sequential reading of the document. For example, read the first thirty sentences, next read the last fifty sentences, followed by reading sentences from line thirty to line fifty.

Figure 8K:
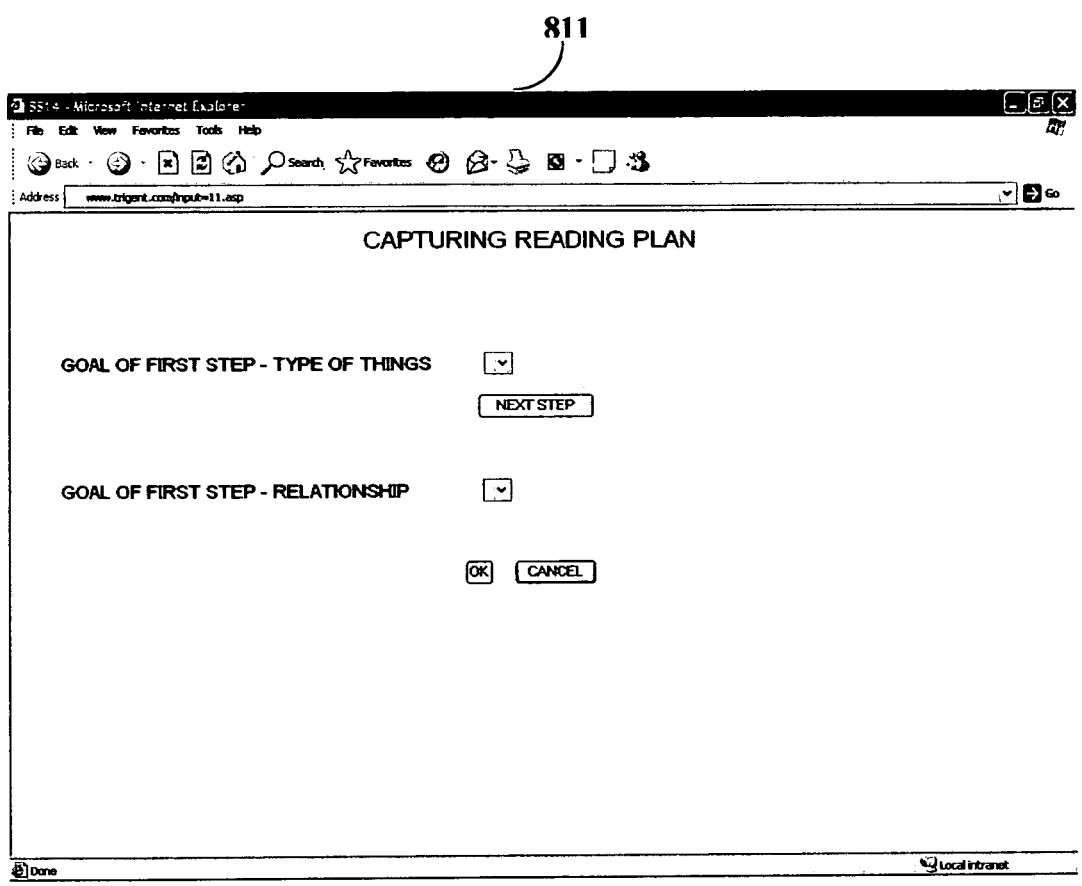

FIG. 8K illustrates a capture of the reading plan 811. The goal of the first step could be to capture the type of thing or the relationship between the types of things.

Figure 8L:
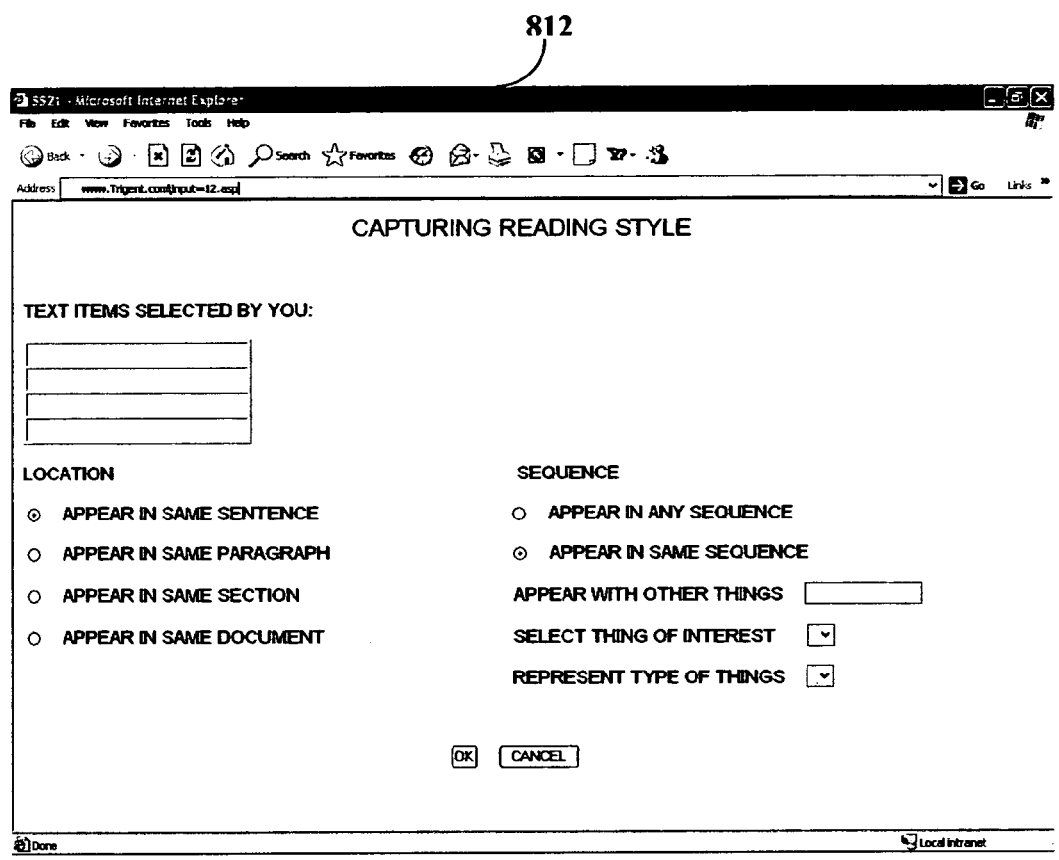

FIG. 8L illustrates a capture of the possible meaning or significance of non-contiguous sequences of words or phrases that may occur in documents of interest 812. The user lists items that he or she would desire to be present in the document. The items could be within the same sentence, paragraph, or section or within a single document. The items could appear in the sequence listed by the user or could occur in any sequence. The items could occur with certain other things in the document, of a certain predefined type. The user can select this thing of interest and classify the type of thing.

Figure 9:
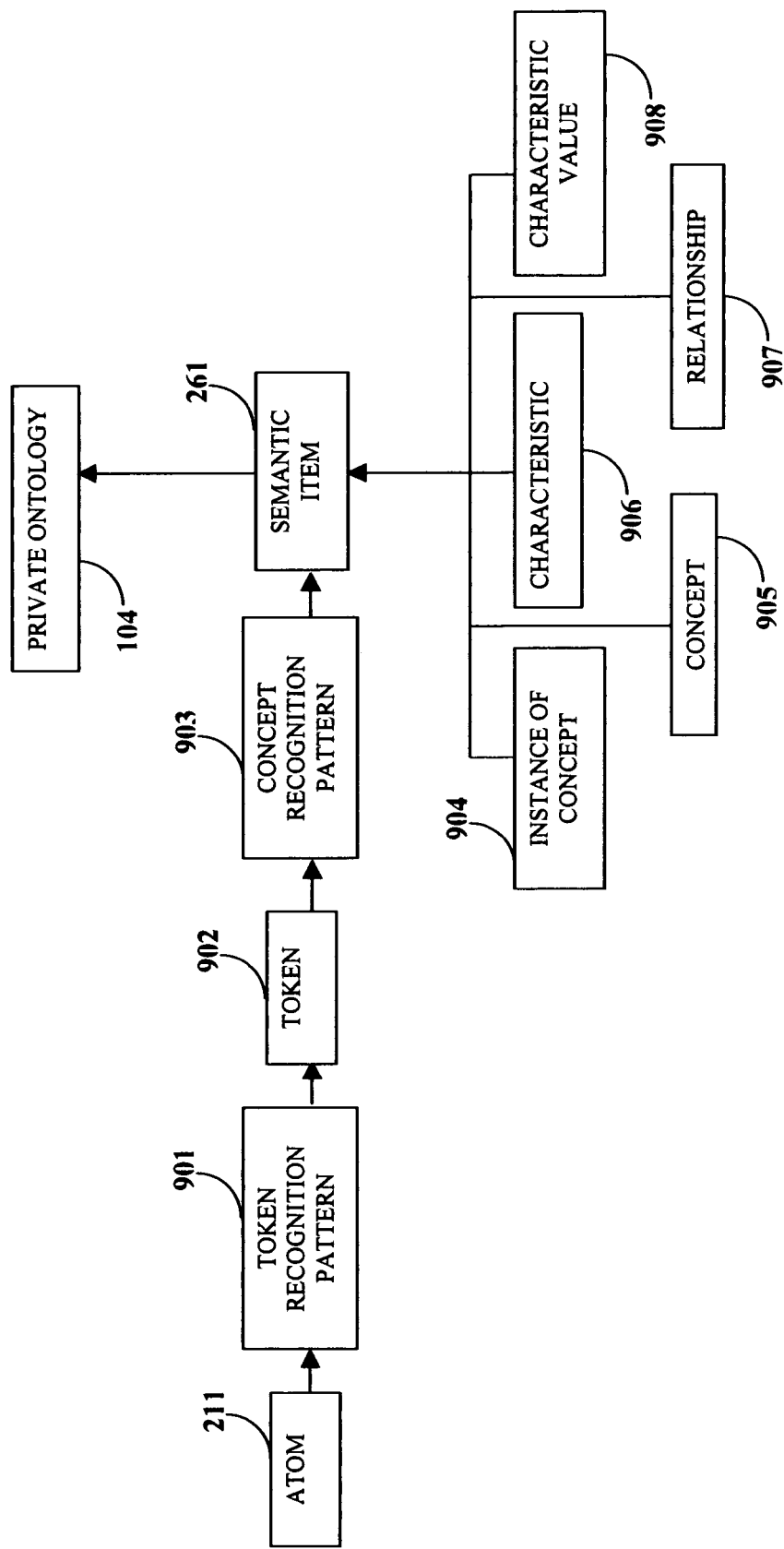
FIG. 9 illustrates the method of creating the private ontology of a user.

FIG. 9 illustrates the method of creating the private ontology of a user. A token recognition pattern 901 interprets tokens 902 from atoms 211. A concept recognition pattern 903 interprets semantic items 261 from tokens 902. Semantic items 261 comprise concepts 905, instances of concepts 904, characteristics 906, characteristic values 908 and relationships 907.

Figure 10:
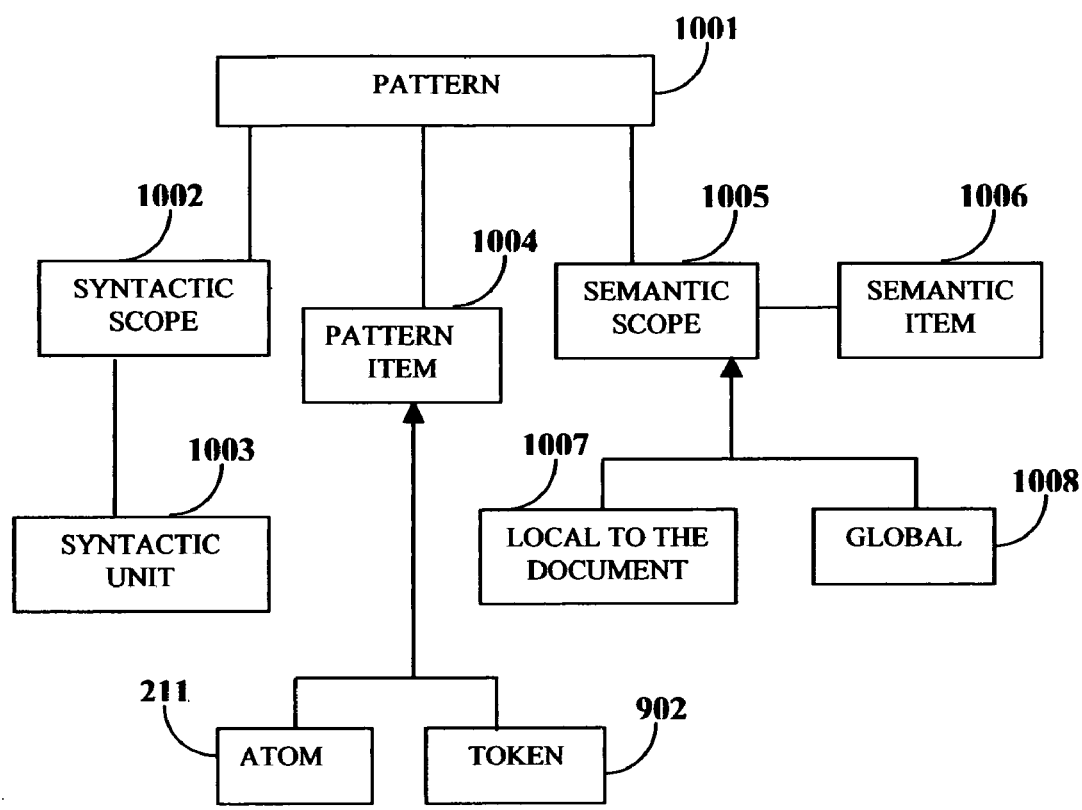
FIG. 10 illustrates the application of patterns to derive semantic items.

FIG. 10 illustrates the application of patterns to derive semantic items. A pattern 1001, i.e., a model is based on the syntactic scope 1002 and semantic scope 1005 of a portion of a document or an entire document, is used to recognize semantic items 1006. The semantic scope 1005 defines the scope or the specific context of a portion of text or document. The semantic scope 1005 pertains to the implied meaning of a portion of document or an entire document. The semantic scope 1005 is either restricted to interpretation locally 1007 to the document, or can represent broad interpretation based on the world knowledge 1008 of the user, irrespective of the context of the document. The syntactic scope 1002 is a rule whereby words or other elements of sentence structure are combined to form grammatical sentences. A syntactic unit 1003 is a unit resulting from a structural partitioning of a document. For example, in a text based document, the syntactic unit can be a word, sentence, paragraph etc. A token recognition pattern is a model to be followed in interpreting tokens from atoms. A concept recognition pattern is a model to follow in interpreting concepts from tokens. The pattern item 1004 includes atoms 211 and tokens 902.

We claim:

1. A method for determining information of interest of a user in an information source or a document corpus, comprising the steps of:
   determining a private ontology of the user, wherein the private ontology comprises definitions of semantic items, wherein each of said semantic items is classified into one of a thing, a type of thing, a characteristic, a value of a characteristic, and a way of relating things, and wherein the private ontology defines a relationship between the semantic items;
   capturing a reading style of the user, wherein said reading style is a set of one or more declared patterns from a training document, wherein each declared pattern identifies one of said semantic items in said private ontology, and wherein capturing reading style comprises:
      capturing said classification of each selected text sample within said information source into one of the semantic items defined by the user; and
      capturing relationship between the semantic items defined by the user;
   determining a reading plan of the user, wherein the reading plan comprises a set of reading plan steps defined by the user that identifies and controls evaluation sequence of text within one or more source documents within the information source;
   creating a worldview of the user using said reading style, said reading plan and said private ontology, wherein the worldview reflects a logic and structure with which a user comprehends a document;
   applying said worldview to said document corpus for determining said information of interest, wherein the information of interest is the information in the document corpus that semantically matches the information in the training document; and
   reporting the information of interest to the user.

2. The method of claim 1, wherein the user defines semantic scope as an identifiable set of semantic items that exist at the time of reading of said text or said document, and wherein said semantic scope defines the scope or specific context of a portion of said text or said document.

3. The method of claim 1, wherein the user inputs equivalent representations for semantic items.

4. The method of claim 1, wherein the user inputs relationship between the types of things and identifies equivalent representation for said relationships.

5. The method of claim 1, wherein the user selects one or more representative training documents to create the worldview.

6. The method of claim 1, wherein the information of interest is harvested from the document corpus applying facts, concepts and patterns that comprise the worldview.

7. The method of claim 1, wherein the information of interest is harvested from the document corpus by applying the private ontology, reading style, and reading plan that comprise the worldview.

8. The method of claim 1, wherein the user communicates with an application in the process of capturing the worldview, while reading a sample document, wherein the communicating step includes aspects of understanding said aspects comprising types of things, thing, characteristic values and relationship between things.

9. The method of claim 1, wherein a shared ontology is imported from an external source to add to the worldview.

10. The method of claim 1, wherein the worldview is derived from the reading style of the user.

11. The method of claim 1, wherein the step of creating the worldview comprises the step of displaying an example source document to the user for the purpose of identifying tokens, wherein tokens represent information of interest within the document.

12. The method of claim 11, wherein the user defines the significance of the tokens in terms of the items in the ontology.

13. The method of claim 12, wherein the step of defining the significance of the tokens comprises the step of determining if the token represents a type of thing.

14. The method of claim 1, wherein the user classifies the type of thing and defines the information of interest around the type of thing.

15. The method of claim 1, wherein classification of the selected sample text and the relationship between semantic items defined by the user items is used to update the reading style system, private ontology and conceptionary.

16. The method of claim 1, wherein the step of applying the worldview comprises the step of determining if a document that is being considered for harvesting the information of interest is a valid document type.

17. The method of claim 1, wherein the reading plan identifies those specific portions of the documents that the user is typically interested in.

18. The method of claim 1, wherein the reading plan sets a start and a length of text in the document from which the information of interest is to be extracted.

19. The method of claim 1, wherein the information of interest is reported to the user in the form of a template and the user can either use an existing template or use a new template, and the template is stored in the private ontology of the user for future use.

20. The method of claim 19, wherein the information of interest is presented to the user in the form of sentences inserted in the template, wherein the sentences are constructed using predefined sentence construction rules.

21. The method of claim 1, wherein the worldview is refined by the user if the user is not satisfied with the information of interest harvested from the document.

22. The method of claim 21, wherein the method of refining the worldview further comprises the steps of:
    selecting a report that requires correction;
    identifying an item of error in the report;
    classifying said item of error as wrong information, imprecise information, extraneous information, or incomplete information;
    displaying to the user the documents that contributed to the item of error; and
    correcting the error, wherein said step of correcting the error is performed by the user.

23. The method of claim 22, wherein if the error is due to incomplete information, the user identifies a reported item that is related to the incomplete information.

24. The method of claim 22, wherein if the error is due to incomplete information, the user identifies additional documents that contains the information of interest.

25. The method of claim 22, wherein if the error is due to extraneous information, the user deletes the references to the extraneous information.

26. A method for determining information of interest of a user in an information source or a document corpus, comprising the steps of:
    providing a sample document to said user, wherein said user reads said sample document and identifies a least a part of said information of interest;
    determining a private ontology of the user, wherein the private ontology comprises definitions of semantic items in one or more domains of interest to the user, wherein each of said semantic items is classified into one of a thing, a type of thing, a characteristic, a value of a characteristic, and wherein the private ontology defines a relationship between the semantic items;
    capturing a reading style of the user during said reading of said sample document, wherein said reading style is a set of one or more declared patterns, wherein each declared pattern identifies one of said semantic items in said private ontology of said user, and wherein capturing reading style comprises:
        capturing classification of each text sample within said information source into one of the semantic items by the user; and
        capturing relationship between the semantic items defined by the user;
    determining a reading plan of the user, wherein the reading plan comprises a set of reading plan steps defined by the user that identifies and controls evaluation sequence of text within one or more source documents within the information source;
    creating a worldview of the user using said reading style, said reading plan and said private ontology, wherein the worldview reflects a logic and structure with which a user comprehends a document;
    applying said worldview to said document corpus and determining said information of interest, wherein the information of interest is the information in the document corpus that semantically matches the information in the training document; and
    reporting the information of interest to the user.

* * * * *